(12) United States Patent
Simonsson et al.

(10) Patent No.: US 9,319,167 B2
(45) Date of Patent: Apr. 19, 2016

(54) TECHNIQUE FOR INTER-CELL INTERFERENCE COORDINATION IN A HETEROGENEOUS COMMUNICATION NETWORK

(75) Inventors: Arne Simonsson, Gammelstad (SE); Laetitia Falconetti, Aachen (DE); Jörg Huschke, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 326 days.

(21) Appl. No.: 13/993,933

(22) PCT Filed: Dec. 14, 2011

(86) PCT No.: PCT/EP2011/006316
§ 371 (c)(1),
(2), (4) Date: Jul. 30, 2013

(87) PCT Pub. No.: WO2012/079757
PCT Pub. Date: Jun. 21, 2012

(65) Prior Publication Data
US 2013/0336274 A1    Dec. 19, 2013

(30) Foreign Application Priority Data
Dec. 15, 2010    (WO) .................. PCT/EP2010/007699

(51) Int. Cl.
*H04W 24/00*        (2009.01)
*H04W 80/04*        (2009.01)
(Continued)

(52) U.S. Cl.
CPC ............. *H04J 11/005* (2013.01); *H04W 16/32* (2013.01); *H04W 72/0453* (2013.01)

(58) Field of Classification Search
CPC ..... H04W 24/00; H04W 80/04; H04W 84/12; H04W 72/04; H04W 88/08
See application file for complete search history.

(56) References Cited

U.S. PATENT DOCUMENTS

2009/0264077 A1* 10/2009 Damnjanovic ............... 455/63.1
2010/0120438 A1* 5/2010 Kone et al. .................... 455/444
(Continued)

FOREIGN PATENT DOCUMENTS

EP      2077685 A1    7/2009
EP      2180739 A1    4/2010

OTHER PUBLICATIONS

Simonsson, Arne, Frequency Reuse and Intercell Interference Co-ordination in E-UTRA, IEEE 65th,Vehicular Technology Conference. VTC2007—Spring. Apr. 2007, pp. 3091-3095, Dublin, Ireland.

*Primary Examiner* — Andrew Lee
(74) *Attorney, Agent, or Firm* — Murphy, Bilak & Homiller, PLLC

(57) ABSTRACT

A technique for assigning transceiver devices to transmission resources for inter-cell interference coordination in a heterogeneous cellular communication network is described. The network comprises a first cell layer having a first cell associated with a first transmission resource and a second cell layer having a second cell associated with a second transmission resource disjunctive from the first transmission resource. In a method implementation, the technique comprises performing a first selection procedure to select a first set of transceiver devices served in the first cell based on the potential of causing interference to transceiver devices served in the second cell, performing a second selection procedure to select a second set of transceiver devices served in the second cell based on the potential of being sensitive to interference from transceiver devices served in the first cell, and assigning the first set of transceiver devices to the first transmission resource and the second set of transceiver devices to the second transmission resource.

50 Claims, 11 Drawing Sheets

(51) Int. Cl.
*H04J 11/00* (2006.01)
*H04W 16/32* (2009.01)
*H04W 72/04* (2009.01)

(56) References Cited

U.S. PATENT DOCUMENTS

| | | | |
|---|---|---|---|
| 2010/0216486 A1* | 8/2010 | Kwon et al. | 455/452.2 |
| 2010/0254295 A1* | 10/2010 | Ahn et al. | 370/312 |
| 2011/0116481 A1* | 5/2011 | Wang | 370/336 |
| 2011/0183679 A1* | 7/2011 | Moon et al. | 455/450 |
| 2011/0194513 A1* | 8/2011 | Kim | 370/329 |
| 2012/0015659 A1* | 1/2012 | Kalyani et al. | 455/436 |
| 2012/0142352 A1* | 6/2012 | Zhang et al. | 455/436 |
| 2012/0157108 A1 | 6/2012 | Boudreau et al. | |
| 2012/0295629 A1* | 11/2012 | Lee et al. | 455/450 |
| 2013/0010964 A1* | 1/2013 | Fong et al. | 380/277 |
| 2013/0044736 A1* | 2/2013 | Tanaka | 370/336 |

* cited by examiner

Bandwidth

Total bandwidth split in at least 2 sub-bands

650

```
┌─────────────────────────────────────────┐
│ PERFORM A FIRST SELECTION PROCEDURE TO  │
│ SELECT A FIRST SET OF TERMINALS SERVED  │
│ IN THE MACRO CELL BASED ON THE POTENTIAL│──── 652
│ OF CAUSING INTERFERENCE TO TERMINALS    │
│ SERVED IN THE PICO CELL                 │
└─────────────────────────────────────────┘
                     │
                     ▼
┌─────────────────────────────────────────┐
│ PERFORM A SECOND SELECTION PROCEDURE TO │
│ SELECT A SECOND SET OF TERMINALS SERVED │
│ IN THE MACRO CELL BASED ON THE POTENTIAL│──── 654
│ OF BEING SENSITIVE TO INTERFERENCE FROM │
│ TERMINALS SERVED IN THE PICO CELL       │
└─────────────────────────────────────────┘
                     │
                     ▼
┌─────────────────────────────────────────┐
│ ASSIGN THE FIRST SET OF TERMINALS AND   │
│ THE SECOND SET OF TERMINALS TO ONE OR   │──── 656
│ MORE DEDICATED SUB-BANDS                │
└─────────────────────────────────────────┘
```

DETERMINE, FOR A GIVEN TERMINAL, A PERFORMANCE DIFFERENCE RESULTING FROM ASSIGNING THE TERMINAL TO A FIRST SUB-BAND RELATIVE TO ASSIGNING THE TRANSCEIVER DEVICE TO A SECOND SUB-BAND — 682

ASSIGN TERMINAL TO EITHER THE FIRST SUB-BAND OR THE SECOND SUB-BAND DEPENDING ON THE PERFORMANCE DIFFERENCE — 684

| Sub-frame | 1 | 2 | 3 | 4 | 5 | 6 | 7 | 8 | 9 | 10 |
|---|---|---|---|---|---|---|---|---|---|---|
| ABS pattern | ■ |  | ■ |  | ■ |  | ■ |  | ■ |  |

■ ABS, or reserved, sub-frame for pico node

| Subframe | 1 | 2 | 3 | 4 | 5 | 6 | 7 | 8 | 9 | 10 |
|---|---|---|---|---|---|---|---|---|---|---|
| ABS pattern |  |  | ■ |  |  |  | ■ |  |  |  |

TECHNIQUE FOR INTER-CELL INTERFERENCE COORDINATION IN A HETEROGENEOUS COMMUNICATION NETWORK

TECHNICAL FIELD

The present disclosure generally relates to cellular communication networks. In particular, a technique is presented for coordinating interference among cells of different cell layers in a communication network.

BACKGROUND

Modern cellular communication networks are vertically structured into individual cell layers. Different cell layers provide wireless network access services via different Radio Access Technology (RAT) types or different configurations of a particular RAT type. For this reason, vertically structured communication networks are also referred to as being heterogeneous.

In heterogeneous network deployments the cell layers typically differ with respect to the coverage area of their individual cells (or, which is equivalent, with respect to the nominal transmit power of their Base Stations, or BSs). In the order of decreasing coverage, macro cells, micro cells, pico cells and femto cells may be defined.

A macro cell provides the largest coverage area at a nominal BS transmit power of some tens of watts. Micro cells are often intended to locally increase network access capacities of macro cells in densely populated areas (e.g., within urban or suburban macro cells). As such, micro cells provide coverage over distances of typically between 300 m and 1000 m from a micro cell BS, which has a nominal transmit power of a few watts. Pico cells provide a more localised coverage than micro cells (at a lower nominal transmit power) and are typically found within buildings such as airport terminals, train stations and shopping centres with insufficient macro or micro cell coverage. In a similar manner, femto cell coverage is even smaller than pico cell coverage at a still lower nominal transmit power.

Today, wireless network access services are mainly provided by Third Generation (3G) communication networks deployed in the form of macro cells. Due to transmit power limitations in mobile terminals, the need for higher throughputs in Fourth Generation (4G) communication networks, especially near the cell edge, combined with the constraint on the uplink (UL) power budget necessitates the introduction of smaller cells such as pico cells.

4G pico cells can utilize different carrier frequencies but can also be overlaid on the same carrier frequencies as used by 3G macro cells. As a consequence, new interference scenarios occur in the resulting heterogeneous networks due to the associated transmit power imbalances and cell association mechanisms. A cell association mechanism defines the BS responsible for a particular mobile terminal (i.e., the serving BS of this mobile terminal). The current cell association mechanisms are mainly based on Reference Signal Received Power (RSRP) measurements performed by the mobile terminal. The RSRP also depends on the transmit power of the serving BS.

In case of a heterogeneous network deployment with macro and pico cell layers as exemplarily shown in FIG. 1A, the RSRP-based cell association and the transmit power imbalance between the two cell layers lead to the following critical situation in the UL. A mobile terminal 8 in the coverage area of both a macro cell 10 and a pico cell 12 (that is located within the macro cell 10) may measure a higher RSRP from the macro BS 14, although it is located closer to the pico BS 16 with lower nominal transmit power. That is, its pathloss to the pico BS 16 is smaller than the pathloss to the macro BS 14. As illustrated in FIG. 1A, this mobile terminal 8 will be served by the macro BS 14 according to the current RSRP-based cell association mechanism. However, to compensate the large pathloss to its serving macro BS 14, the mobile terminal 8 will use a high transmit power. Therefore, signals of this mobile terminal will strongly interfere with signals of mobile terminals associated with the pico BS 16.

One way to avoid this interference scenario is to extend the coverage area of pico BSs, for example by using a cell association mechanism that is based on pathloss. In that case, however, strong downlink (DL) interference will be experienced by mobile terminals served in pico cells and located at the border between the coverage areas of macro and pico cells. This DL interference is caused by the fact that the DL transmit power of the macro BS will remain much higher than the DL transmit power of the pico BS.

Similar or reverse interference problems exist in other deployment scenarios of a heterogeneous communication network. Moreover, mobile terminals served by macro BSs may also be interfered by pico BSs, in particular in DL if access to the pico BS is limited to a group of particular subscribers.

SUMMARY

Accordingly, there is a need for an efficient inter-cell interference coordination in a heterogeneous communication network.

According to a first aspect, a method of assigning transceiver devices to transmission resources for inter-cell interference coordination in a heterogeneous communication network with a first cell layer having a first cell associated with a first transmission resource and a second cell layer having a second cell associated with a second transmission resource disjunctive from the first transmission resource is provided. The method comprises performing a first selection procedure to select a first set of transceiver devices served in the first cell based on the potential of causing interference to transceiver devices served in the second cell, performing a second selection procedure to select a second set of transceiver devices served in the second cell based on the potential of being sensitive to interference from transceiver devices served in the first cell, and assigning the first set of transceiver devices to the first transmission resource and the second set of transceiver devices to the second transmission resource.

The transmission resource may be defined in a time dimension (e.g., by time division), in a frequency dimension (e.g., by frequency division) or as a combination thereof. As a frequency dimension example, the transmission resources may comprise dedicated sub-bands or any other dedicated spectral portions. As a time dimension example, the transmission resources may comprise dedicated sub-frames or any other dedicated transmission units having an extension in time.

At least one of the transmission resources, or a portion of a transmission resource, may be configured as a common transmission resource to which both transceiver devices served in the first cell and transceiver devices served in the second cell can be assigned. In the frequency dimension example, a soft frequency re-use scheme may be implemented, and a similar implementation may be realized for a time dimension example.

The first selection procedure and the second selection procedure may be performed using different selection rules. The different selection rules may take into account that in a heterogeneous cellular communication network there may be an asymmetry between transceiver devices having the potential of causing interference and the transceiver devices being sensitive to interference.

The first cell and the second cell may be associated with disjunctive coverage areas or with coverage areas that overlap at least partially. In one implementation, the coverage area of the second cell may substantially overlap with the coverage area of the first cell (e.g., the coverage area of the first cell may include the coverage area of the second cell).

The first cell may be associated with at least one of a higher nominal transmit power and a larger coverage area than the second cell. For example, the first cell may be a macro cell, and the second cell may be any one of a micro cell, a pico cell or a femto cell. Of course, the first cell can also be a micro cell, in which case the second cell may be any one of a pico cell or a femto cell. Still further, the first cell may be a pico cell and the second cell may be a femto cell.

In one implementation, a third selection procedure is performed to select a third set of transceiver devices served in the first cell based on the potential of being sensitive to interference from transceiver devices served in the second cell. The third set of transceiver devices may be assigned to the first transmission resource or any other transmission resource (e.g., any other spectral or temporal portion) different from the second transmission resource. In a second implementation, that may optionally be combined with the first implementation, a fourth selection procedure is performed to select a fourth set of transceiver devices served in the second cell based on the potential of causing interference to transceiver devices served in the first cell. The fourth set of transceiver devices may be assigned to the second transmission resource or any other transmission resource (e.g., any other spectral or temporal portion) different from the first transmission resource.

Each of the first cell and the second cell may be associated with one or more further transmission resources. For example, the first cell may further be associated with a third transmission resource and the second cell may further be associated with a fourth transmission resource.

Transceiver devices served in the first cell and not included in at least one of the first set (e.g., transceiver devices having a low potential of causing interference to transceiver devices serves in the second cell) and the third set may (e.g., exclusively or primarily) be assigned to the third transmission resource. Such an assignment may, for example, be performed until the third transmission resource becomes highly populated with transceiver devices (in which case such transceiver devices may be assigned to the first transmission resource). In a similar manner, transceiver devices served in the second cell and not included in at least one of the second set (e.g., transceiver devices insensitive to interference from transceiver devices served in the first cell) and the fourth set may (e.g., exclusively or primarily) be assigned to the fourth transmission resource. Again, such an assignment may take place until the fourth transmission resource becomes highly populated with transceiver devices (in which case such transceiver devices may be assigned to the second transmission resource). To determine a high population state of a particular transmission resource, a threshold decision may be applied. In this regard, the number of transceiver devices populating a particular transmission resource may be compared with a threshold.

The fourth transmission resource associated with the second cell may be disjunctive from the third transmission resource associated with the first cell. Accordingly, there may not be any (e.g., spectral or temporal) overlap between the fourth transmission resource and the third transmission resource. On the other hand, there may exist an at least partial overlap between at least one of the first transmission resource and the fourth transmission resource on the one hand and the second transmission resource and the third transmission resource on the other. In one realization, the first transmission resource may be identical with the fourth transmission resource and the second transmission resource may be identical with the third transmission resource.

The approach of assigning transceiver devices to transmission resources presented herein may be combined with a cell association mechanism. Accordingly, a decision about associating a particular transceiver device with either the first cell or the second cell may be performed before assigning the transceiver device to any transmission resource. This decision may be based on one or more measurements, including power measurements, pathloss measurements, and so on. The power measurements may involve RSRP measurements.

In a similar manner, the selection procedures preceding the assignment of transceiver devices to transmission resources may be based on power (e.g., transmit power) and/or pathloss parameters. As an example, selecting a transceiver device u having the potential of causing interference may be performed based on the selection parameter $$TG_u = \frac{w_{BS0} \cdot TxP_{BS0} \cdot PL_{u,BS0}}{\sum_{j \in M \setminus BS0} w_{BSj} \cdot TxP_{BSj} \cdot PL_{u,BSj}},$$

wherein M is the set of cells BSj belonging to a cell layer different than the cell layer of the cell BS0 serving transceiver device u, $TxP_{BSj}$ is the downlink transmit power of cell BSj, $PL_{u,BSj}$ is the pathloss from transceiver device u to BSj, and $w_{BSj}$ is an (e.g., optional) weight for BSj.

Additionally, or in the alternative, selecting transceiver devices having the potential of causing interference may comprise a two-step procedure. In a first step, for a given cell, transceiver devices served by this cell and having a large pathloss to the serving base station are determined. Among the transceiver devices thus determined, in a second step, all transceiver devices having a low pathloss to a base station of any cell belonging to a different cell layer than the given cell are selected.

As a further alternative, or additionally, selecting transceiver devices based on the potential of causing interference may comprise determining, for a given transceiver device served by a given cell, an interference parameter from an estimated pathloss of the transceiver device to a base station of a cell belonging to a different cell layer than the given cell and an estimated transmit power of the transceiver device. The transceiver device may then be selected dependent on the interference parameter thus determined. In one implementation, the pathloss is estimated based on a power measurement report received from the transceiver device. The transmit power may be estimated based on at least one of a power headroom report received from the transceiver device and a predefined power setting equation.

On the other hand, selecting a transceiver device u having the potential of being sensitive to interference may be performed based on the selection parameter $$R_u = \frac{w_{BS0} \cdot TxP_u \cdot PL_{u,BS0}}{\sum_{j \in M \setminus BS0} w_{BSj} \cdot TxP_{Fj} \cdot PL_{Fj,BS0}},$$

wherein M is the set of cells BSj belonging to a cell layer different than the cell layer of the cell BS0 serving transceiver device u, Fj refers to a real or fictive transceiver device that would be served by BSj and would be located the closest to the border of the coverage area of BS0, TxP is the uplink transmit power of the respective transceiver device, $PL_{BSj}$ is the pathloss from the respective transceiver device to BSj, and $w_{BSj}$ is an (e.g., optional) weight for BSj.

The assignment technique presented thus far was described in the context of InterCell Interference Coordination (ICIC) between cells of different cell layers ("vertical ICIC"). As will be appreciated, ICIC can also be performed in relation to cells of the same cell layer ("horizontal ICIC"). In the following, horizontal ICIC approaches for the first cell layer and the second cell layer will be described in more detail.

For example, the first cell layer may comprise a plurality of cells, such as a third cell in addition to the first cell. In such an implementation, a particular transmission resource may be divided in a first portion and a second portion disjunctive from the first portion. In a next step, a fifth selection procedure may be performed to select among the transceiver devices of the first set a fifth set of transceiver devices based on the potential of causing interference to transceiver devices served in the third cell or based on the potential of being sensitive to interference from transceiver devices served in the third cell. The fifth set of transceiver devices may be assigned to the first portion of the particular transmission resource. Optionally, a sixth selection procedure may be performed to select among the transceiver devices served in the third cell a sixth set of transceiver devices based on the potential of causing interference to transceiver devices served in the first cell or based on the potential of being sensitive to interference from transceiver devices served in the first cell. The sixth set of transceiver devices may be assigned to the spectrum portion of the particular transmission resource for ICIC purposes (as the fifth set of transceiver devices is assigned to the first portion of the particular transmission resource).

In a similar manner, the second cell layer may comprise one or more further cells, such as a fourth cell in addition to the first cell. Again, a particular transmission resource may be divided in a first portion and a second portion disjunctive from the first portion. A seventh selection procedure may then be performed to select among the transceiver devices of the second set a seventh set of transceiver devices based on the potential of causing interference to transceiver devices served in the fourth cell or based on the potential of being sensitive to interference from transceiver devices served in the fourth cell. An optional eighth selection procedure may be performed to select among the transceiver devices served in the fourth cell an eighth set of transceiver devices based on the potential of causing interference to transceiver devices served in the second cell or based on the potential of being sensitive to interference from transceiver devices served in the second cell. Again for ICIC purposes, the seventh set of transceiver devices may be assigned to the first portion of the particular transmission resource, while the eighth set of transceiver devices may be assigned to the second portion of the particular transmission resource.

The particular transmission resource in the above scenarios may be either one of the first transmission resource and the third transmission resource for the first cell layer. As for the second cell layer, the particular transmission resource may be either one of the second transmission resource and the fourth transmission resource.

The technique presented herein may be implemented in communication networks in which transmission resources are distributed among transceiver devices in various manners. As an example, the transmission resources may be distributed according to a time division schedule, according to a frequency division schedule or according to a combined time/frequency division schedule. In the latter case and in similar cases (i.e., when the transceiver devices are configured to transmit on transmission resources representable as a resource grid spanning two resource dimensions such as time and frequency), adjacent regions of the resource grid may be allocated to different types of transceiver devices.

As an example, transceiver devices served in the first cell and having the potential of causing interference to transceiver devices served in the second cell may be co-scheduled with transceiver devices served in the second cell and being insensitive to interference from transceiver devices served in the first cell in adjacent regions of the resource grid. Additionally, or as an alternative, transceiver devices served in the second cell and having the potential of causing interference to transceiver devices served in the first cell may be co-scheduled with transceiver devices served in the first cell and being insensitive to interference from transceiver devices served in the second cell in adjacent regions of the resource grid.

The resource allocation approach may be extended further by controlling a data transmission of a transceiver device in accordance with the available transmission resources in the specific region of the resource grid allocated the transceiver device. As an example, the data transmission rate may be decreased in the case of insufficient transmission resources. In another variant, one or more neighboring regions of the resource grid may additionally be allocated to a transceiver device, to which a specific resource grid region has been allocated, depending on the amount of data to the transmitted by the transceiver device. That is, if the data to be transmitted exceed the capacity of the currently allocated resource region, the transceiver device may be instructed to extend its data transmission operation to one or more neighboring regions of the resource grid.

For a given transceiver device, a performance difference resulting from assigning the transceiver device to the first transmission resource relative to assigning the transceiver device to the second transmission resource may be determined. In a next step, the transceiver device may be assigned to either the first transmission resource or the second transmission resource depending on the performance difference thus determined.

An adjustment operation may be performed to dynamically adjust at least one of a size of the first transmission resource and size of the second transmission resource. The adjustment operation may be based on a population state of one or both of the first transmission resource and the second transmission resource. The population state of the first transmission resource may be signaled from the first cell to the second cell. Alternatively, or in addition, the population state of the second transmission resource may be signaled from the second cell to the first cell.

The adjustment operation may be performed such that a combined size (e.g., a total bandwidth or temporal extension) of the first transmission resource and the second transmission resource remains constant. In other words, the adjustment operation may comprise a re-partitioning of the total bandwidth or temporal extension available for assignment purposes.

According to a further aspect, a method of assigning transceiver devices to transmission resources for inter-cell interference coordination in a heterogeneous communication network with a first cell layer having a first cell associated with a first transmission resource and a second transmission resource and a second cell layer having a second cell is provided. The method comprises performing a first selection procedure to select a first set of transceiver devices served in the first cell based on the potential of causing interference to transceiver devices served in the second cell, performing a second selection procedure to select a second set of transceiver devices served in the first cell based on the potential of being sensitive to interference from transceiver devices served in the second cell, and assigning the first set of transceiver devices to a first transmission resource and the second set of transceiver devices to the second transmission resource.

In one implementation, the first transmission resource is disjunctive from the second transmission resource. However, the first transmission resource and the second transmission resource may also (at least partially) overlap. The second transmission resource may also be identical with the first transmission resource.

According to the second method aspect, a performance difference may be determined, for a given transceiver device, that results from assigning the transceiver device in the first transmission resource relative to assigning the transceiver device in the second transmission resource. Based thereon, the transceiver device may be assigned to either the first transmission resource or the second transmission resource depending on the performance difference.

This second method aspect may be readily combined with the first method aspect (and its various implementations) discussed above. For example, the second cell may likewise be associated with two transmission resources, and the assignment procedures with respect to the resulting four transmission resources may be performed as discussed in the context of the first method aspect above.

According to a still further aspect, a method is provided of assigning transceiver devices to transmission resources for inter-cell interference coordination in a heterogeneous communication network with a first cell layer having a first cell associated with a first transmission resource and a second cell layer having a second cell associated with a second transmission resource disjunctive from the first transmission resource, wherein the first transmission resource is populated with transceiver devices served in the first cell and having the potential of causing interference to transceiver devices served in the second cell, and the second transmission resource is populated with transceiver devices served in the second cell and having the potential of being sensitive to interference from transceiver devices served in the first cell, the method comprises determining, for a given transceiver device, a performance difference resulting from assigning the transceiver device to the first transmission resource relative to assigning the transceiver device to the second transmission resource, and assigning the transceiver device to either the first transmission resource or the second transmission resource depending on the performance difference.

This third method aspect may be combined with any one of the first method aspect and the second method aspect (and their various implementations) discussed above.

The performance difference may be determined based on an interference level of the first transmission resource relative to an interference level of the second transmission resource. Moreover, the performance difference may be indicative of a bitrate improvement (e.g., a bitrate improvement factor) for the transceiver device. In one variant, the bitrate improvement is determined based on the interference levels of the first transmission resource and the second transmission resource.

A ranking among the set of transceiver devices that are to be assigned to transmission resources may be determined. In such an implementation, the determining and assigning steps may be performed for one or more of the transceiver devices in accordance with their ranking within the set. As an example, the ranking may be determined for each transceiver device of the set based on the estimated likelihood that the transceiver device will be assigned to the first transmission resource (or to the second transmission resource). The ranking of each transceiver device of the set may be determined based on its received power. In one implementation, the received power-based ranking takes into consideration the received power of a useful or wanted signal (e.g., as received from a serving BS).

In a ranking scenario, the determining step may be performed until a first transceiver device of the set is assigned to another transmission resource than transceiver devices having a higher ranking than the first transceiver device. Transceiver devices having a lower ranking than the first transceiver device may also be assigned to the other transmission resource. In one implementation, this assignment is performed without performing the determining step for the transceiver devices having the lower ranking.

The performance difference may be applied to a threshold decision in connection with assigning the transceiver device to either the first transmission resource or the second transmission resource. A threshold value for the threshold decision may be based on a size of the first transmission resource relative to combined size of the transmission resources to which the transceiver device may be assigned. Additionally, an adjustment operation may be dynamically performed to adjust the size of at least one of the first transmission resource and the second transmission resource. In such an implementation, the threshold value may be adapted responsive to the adjustment operation.

According to a still further aspect, a computer program product is provided. The computer program product comprises program code portions for performing the steps of any of the methods described herein when the computer program product is run or executed on one or more computing devices. The computer program product may be stored in a computer-readable recording medium such as a permanent or rewritable memory, a CD-ROM, or a DVD. The computer program product may also be provided for download via a computer network such as the Internet, a cellular communication network or a wireless or wired Local Area Network (LAN).

Also provided is a system for assigning transceiver devices to transmission resources for inter-cell interference coordination in a heterogeneous communication network with a first cell layer having a first cell associated with a first transmission resource and a second cell layer having a second cell associated with a second transmission resource disjunctive from the first transmission resource. The system comprises a first processor adapted to select a first set of transceiver devices served in a first cell based on the potential causing interference to transceiver devices served in a second cell and to assign the first set of transceiver devices to the first transmission resource. The system further comprises a second processor adapted to select a second set of transceiver devices served in the second cell based on the potential of being sensitive to interference from transceiver devices served in the first cell and to assign the second set of transceiver devices to the second transmission resource.

The system may be implemented within base stations of the communication network. As an example, the first processor may be implemented in a first base station associated with the first cell of the first cell layer, and the second processor may be implemented in a second base station associated with the second cell of the second cell layer.

Also provided is a device for assigning transceiver devices to transmission resources for inter-cell interference coordination in a heterogeneous communication network with a first cell layer having a first cell associated with a first transmission resource and a second transmission resource and a second cell layer having a second cell. The device comprises a processor having a first selector adapted to select a first set of transceiver devices served in the first cell based on the potential of causing interference to transceiver devices served in the second cell, a second selector adapted to select a second set of transceiver devices served in the first cell based on the potential of being sensitive to interference from transceiver devices served in the second cell, and an assignor adapted to assign the first set of transceiver devices to the first transmission resource and the second set of transceiver devices to the second transmission resource.

According to a further aspect, a device for assigning transceiver devices to transmission resources for inter-cell interference coordination in a heterogeneous communication network with a first cell layer having a first cell associated with a first transmission resource and a second cell layer having a second cell associated with a second transmission resource disjunctive from the first transmission resource is provided, wherein the first transmission resource is populated with transceiver devices served in the first cell and having the potential of causing interference to transceiver devices served in the second cell, and the second transmission resource is populated with transceiver devices served in the second cell and having the potential of being sensitive to interference from transceiver devices served in the first cell, wherein the device comprises a processor having a determinater adapted to determine, for a given transceiver device, a performance difference resulting from assigning the transceiver device to the second transmission resource relative to assigning the transceiver device to the first transmission resource and an assignor adapted to assign the transceiver device to either the first transmission resource or the second transmission resource depending on the performance difference.

Again, the second transmission resource may at least partially overlap with the first transmission resource. Moreover, the device may be implemented in a base station of the communication network, such as the base station of the first cell (which belongs to the first cell layer).

The transceiver devices may generally be implemented as mobile or as stationary devices. As an example, the transceiver devices may be implemented as mobile telephones, smartphones, tablet computers, data or network cards or sticks, notebooks, and so on.

The technique presented herein may be realized in a form of a device, apparatus or system. Alternatively, or in addition, the technique may also be realized in the form of a method, process, function or service.

BRIEF DESCRIPTION OF THE DRAWINGS

In the following, further technical details, aspects and advantages of the technique presented herein will be discussed in connection with exemplary embodiments illustrated in the drawings, wherein

FIGS. 6A to 6C illustrate flow diagrams representative of method embodiments for assigning transceiver devices to sub-bands based on the bandwidth partitioning scheme illustrated in FIG. 4;

DETAILED DESCRIPTION

In the following description, for purposes of explanation and not limitation, specific details are set forth, such as specific device and system configurations as well as specific bandwidth partitioning schemes to provide a thorough understanding of the technique presented herein. It will be apparent to one skilled in the art that this technique may be practiced in other embodiments that depart from these specific details. For example, while the following embodiments will primarily be described in the context of two cell layers, it will be readily apparent that the technique can readily be extended to three or more cell layers. Additionally, while the following explanations will mainly relate to macro and pico cells, it will be appreciated that the technique presented herein is likewise applicable to other cell types differing with respect to at least one of nominal transmit power and cell coverage area. Moreover, the present technique is not limited to any particular RAT type or combination of RAT types.

Those skilled in the art will further appreciate that the methods, steps and functions explained herein may be implemented using individual hardware circuitry, using software functioning in conjunction with a programmed micro processor or general purpose computer, using one or more Application Specific Integrate Circuits (ASICs), one or more Digital Signal Processors (DSPs) and/or one or more Field Programmable Gate Arrays (FPGAs). It will also be appreciated that the technique disclosed herein may be embodied in a processor and a memory coupled to the processor, wherein the memory stores one or more programs that perform the steps discussed herein when executed by the processor.

Figure 1A:
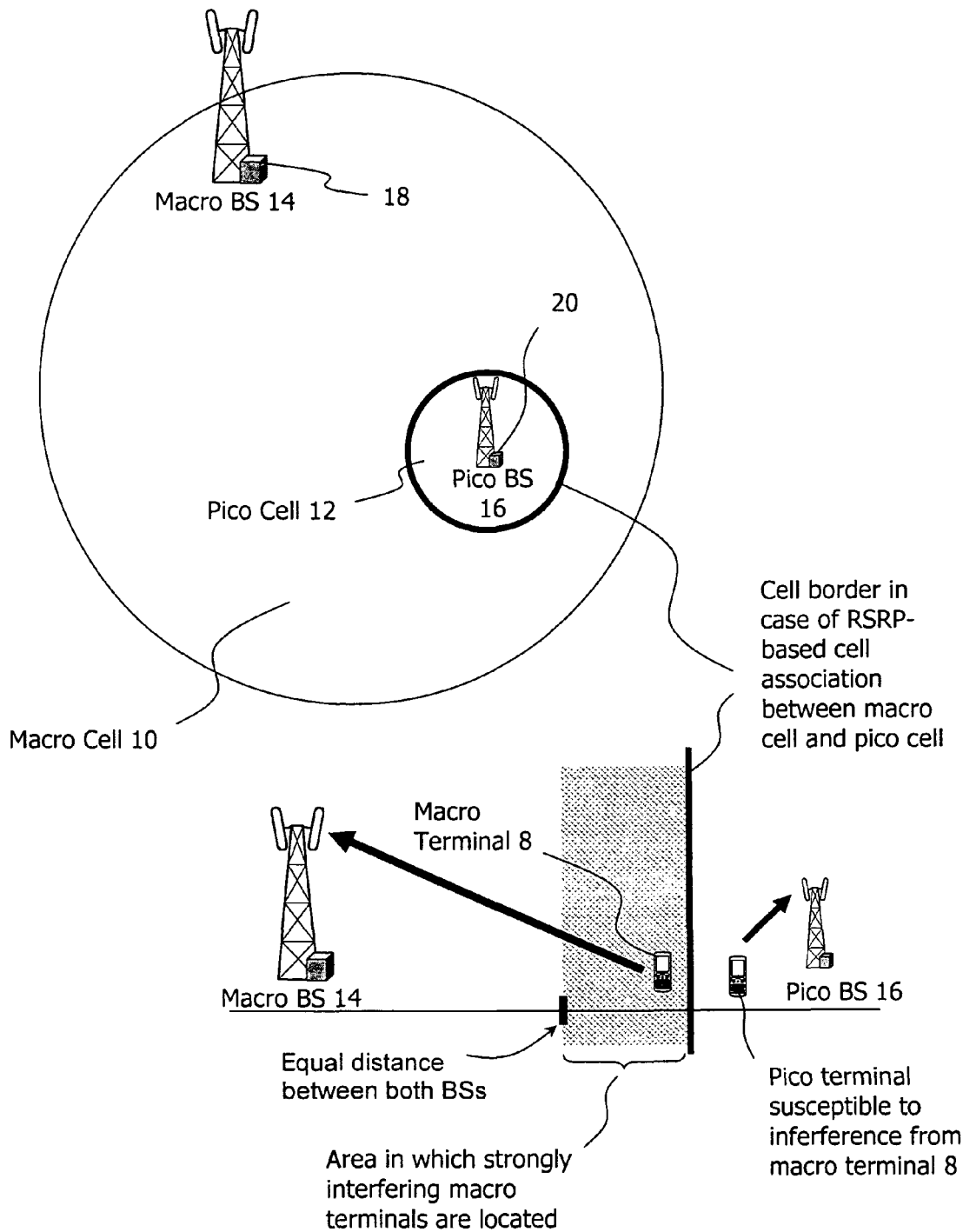
FIG. 1A shows an embodiment of a heterogeneous cellular communication network comprising a macro cell layer and a pico cell layer.

Embodiments of ICIC schemes for heterogeneous network deployments as illustrated in FIG. 1A may be implemented in communication networks supporting the RAT type 3GPP Long Term Evolution (LTE), such as LTE Release 10 (e.g., on a macro cell layer). LTE and other network systems permit to allocate transmission resources in accordance with a two-dimensional resource grid. A first dimension of the resource grid is defined by time (time division), while a second resource dimension is defined by frequency (frequency division). The resulting transmission resources (e.g., sub-frames and/or sub-bands) can advantageously be exploited to realize the vertical ICIC schemes presented herein.

Possible implementations may, for example, apply Almost Blank Sub-frame (ABS)-based, Reduced Power Sub-frame (RPS)-based or Fractional Frequency Reuse (FFR)-based ICIC schemes as well as combinations thereof. In the following, various FFR-based ICIC schemes will be described first.

Figure 2:
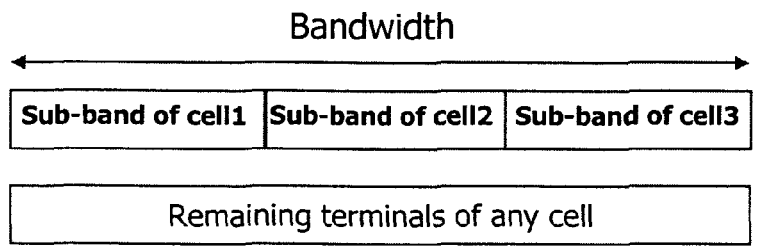
FIG. 2 illustrates an exemplary bandwidth partitioning scheme for horizontal ICIC in a homogeneous cellular communication network.

The basic idea of FFR is to partition the available transmission bandwidth into several sub-bands and to assign non-overlapping sub-bands to adjacent cells. An individual sub-band constitutes an individual transmission resource. An example of a partitioning assignment for horizontal ICIC within a particular cell layer is illustrated in FIG. 2 for a scenario with three adjacent cells.

As understood herein, a sub-band may be any continuous or discontinuous spectral portion having well-defined boundaries and being associated with one or more cells (or one or more BSs). Associations between sub-bands and cells or BSs may be statically determined or may alternatively be dynamically defined.

In case of soft frequency reuse, BSs are not bound to assign transceiver devices exclusively to their associated sub-band. Rather, they may assign transceiver devices to the associated sub-band with higher priority than to the other sub-bands. The associated sub-band in this case is called preferred or prioritized sub-band of the respective cell.

One important aspect that influences FFR performance gains is the selection of transceiver devices that will be assigned to the sub-band associated with a particular cell (and with a particular BS). As mentioned above, in FFR BSs may schedule transceiver devices anywhere in the available bandwidth, and not necessarily in their associated sub-band. In order to achieve interference reduction for transceiver devices that are sensitive to interference, it should be ensured that these transceiver devices are not scheduled in the same sub-band as strongly interfering transceiver devices served by adjacent BSs.

In a homogeneous deployment with a single cell layer, the transceiver devices that are sensitive to interference are usually also the ones that cause high interference to transceiver devices in adjacent cells. In the UL the reason for this concurrence is the following: a sensitive transceiver device is one that has high pathloss to the serving BS, and therefore the power received by the serving BS is low, in particular if the transceiver device reaches its power limit. A transceiver device with high pathloss is typically at the cell border (commonly called cell-edge transceiver device), which is where it is also closest to adjacent cells (and adjacent BSs). For these adjacent cells the transceiver device (especially when operating at its power limit) is typically a strong interferer. Therefore, by assigning cell-edge transceiver devices to its prioritized sub-band as illustrated in FIG. 2, a serving BS both protects them from interference and avoids causing too much interference to cell-edge transceiver devices of adjacent cells that assign their sensitive transceiver devices to the respective prioritized sub-bands as well.

An exemplary criterion to identify cell-edge transceiver devices is called geometry. The geometry $G_u$ of a transceiver device u served by BS0 is given by $$G_u = \frac{TxP_{BS0} \cdot PL_{BS0,u}}{\sum_{i \in S \setminus BS0} TxP_i \cdot PL_{i,u} + N},$$

where S is the set of adjacent BSs, TxP is the transmit power of the considered BS, PL is the pathloss from the transceiver device u to the considered BS, and N is the receiver noise power. By subjecting the geometry parameter derived for a particular transceiver device to, for example, a threshold decision, it can be determined whether or not the particular transceiver device is located at a cell edge.

In a heterogeneous deployment, the set of transceiver devices sensitive to interference may not correspond to the set of transceiver devices causing strong inter-cell interference. As an example, transceiver devices served in pico cells and sensitive to interference are not necessarily causing much interference to transceiver devices that are served in adjacent or overlapping macro cells and sensitive to interference. In a similar manner, transceiver devices served in a macro cell and close to the border of a pico cell may not necessarily be the ones that cause the strongest interference in the pico cell.

This asymmetric interference characteristic of a heterogeneously deployed cellular communication network will now be described in more detail for the exemplary network deployment of FIG. 1A with reference to the schematic diagram of FIG. 3. In the following, transceiver devices served in macro cell 10 will be referred to as macro terminals M, and transceiver devices served in pico cell 12 will be referred to as pico terminals P. Moreover, macro terminals sensitive to interference from pico terminals will be denoted Ms, while pico terminals sensitive to interference from macro terminals will be denoted Ps. In a similar manner, macro terminals having the potential of creating high interference to pico terminals will be referred to as Mi, while pico terminals having the potential of creating high interference to macro terminals will be referred to as Pi. It should be noted that the following embodiments—unless otherwise indicated—refer to UL transmissions from the terminals to their serving BSs.

As has been discussed above, cell-edge terminals (i.e., terminals located far away from their serving BS) are the ones that are most sensitive to inference. Due to the distance from the BS and the associated pathloss, their signals are received at a comparatively low power level at the serving BS. Similarly, also the BS signals are received at a comparatively low power level by the cell-edge terminals, which makes these terminals more sensitive to interference than terminals with smaller pathloss to the serving BS. In the scenario illustrated in FIG. 3, these terminals are therefore referred to as Ms and Ps for the macro cell 10 and the pico cell 12, respectively.

In the UL, the transmit power of a terminal is adjusted to overcome the pathloss to its serving BS. Therefore, terminals located far away from their serving BS use a comparatively high transmit power and may therefore be potential interferers from the perspective of terminals served in other cells. It should be noted that the transmit power of a terminal alone typically not suffices to determine if the terminal has the potential of strongly interfering with a particular BS. Rather, the interference potential not only depends on the absolute transmit power of a particular terminal, but additionally on the pathloss from the terminal to the adjacent BS. This means that only in the case of a high pathloss to its serving BS (high transmit power) and an additional small pathloss to its adjacent BS the terminal represents a strong interferer for the adjacent BS. These considerations are reflected in the schematic diagram of FIG. 3, in which macro terminals that are expected to create particularly high interference to pico cell 12 are indicated as Mi, while pico terminals that are expected to create particularly high interference to the macro cell 10 are indicated as Pi.

Figure 3:
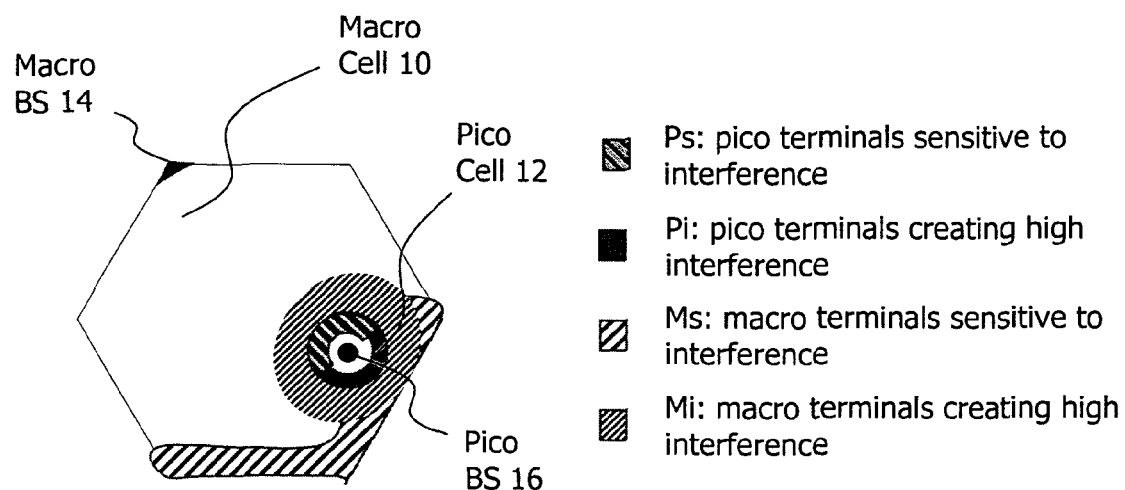
FIG. 3 illustrates an exemplary interference situation in the communication network of FIG. 1A.

As becomes apparent from FIG. 3, the set of terminals sensitive to interference and the set of terminals creating high interference neither match for the macro cell 10 nor for the pico cell 12. Consequently, the transceiver device selection mechanisms used for FFR in homogeneous deployments are not suited for a heterogeneous deployment and lead to sub-optimal performance.

Figure 4:
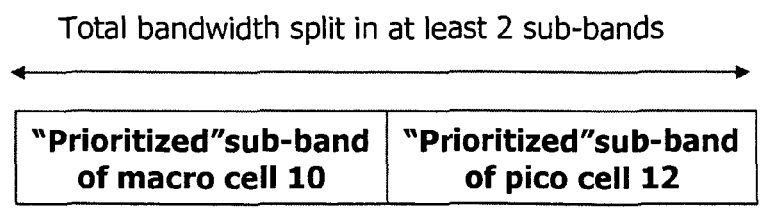
FIG. 4 illustrates an embodiment of an uplink bandwidth partitioning scheme for vertical ICIC in the heterogeneous cellular communication network illustrated in FIG. 1A.

To implement FFR-based ICIC in a heterogeneously deployed cellular communication network comprising two or more cell layers, continuous or discontinuous spectral resources available for UL transmissions are partitioned into at least two sub-bands. FIG. 4 illustrates such a partitioning for the exemplary communication network illustrated in FIGS. 1A and 3 and for the exemplary case of a continuous UL transmission bandwidth that is partitioned into a first "prioritized" sub-band associated with one or more cells of a first cell layer (e.g., macro cell 10) and a second "prioritized" sub-band associated with one or more cells of a second cell layer (e.g., pico cell 12).

As becomes apparent from FIG. 4, the two sub-bands are disjunctive from each other, which means that there is no (or at least no considerable) spectral overlap between the two sub-bands. It will be appreciated that for each additional cell layer, a dedicated additional "prioritized" sub-band will be added. In an exemplary network implementation with three cell layers, the available uplink transmission bandwidth will thus be split in three sub-bands, and so on.

In the following, various embodiments for populating the individual sub-bands shown in FIG. 4 will be discussed in more detail with reference to the exemplary assignment scenarios illustrated in FIGS. 5A, 5B and 5C. In general, the selection (and assignment) of terminals to sub-bands for vertical ICIC purposes may be governed by one or more selection (and assignment) rules implemented by processors 18, 20 associated with the individual base stations 14, 16 as shown in FIGS. 1A and 1B.

Figure 1B:
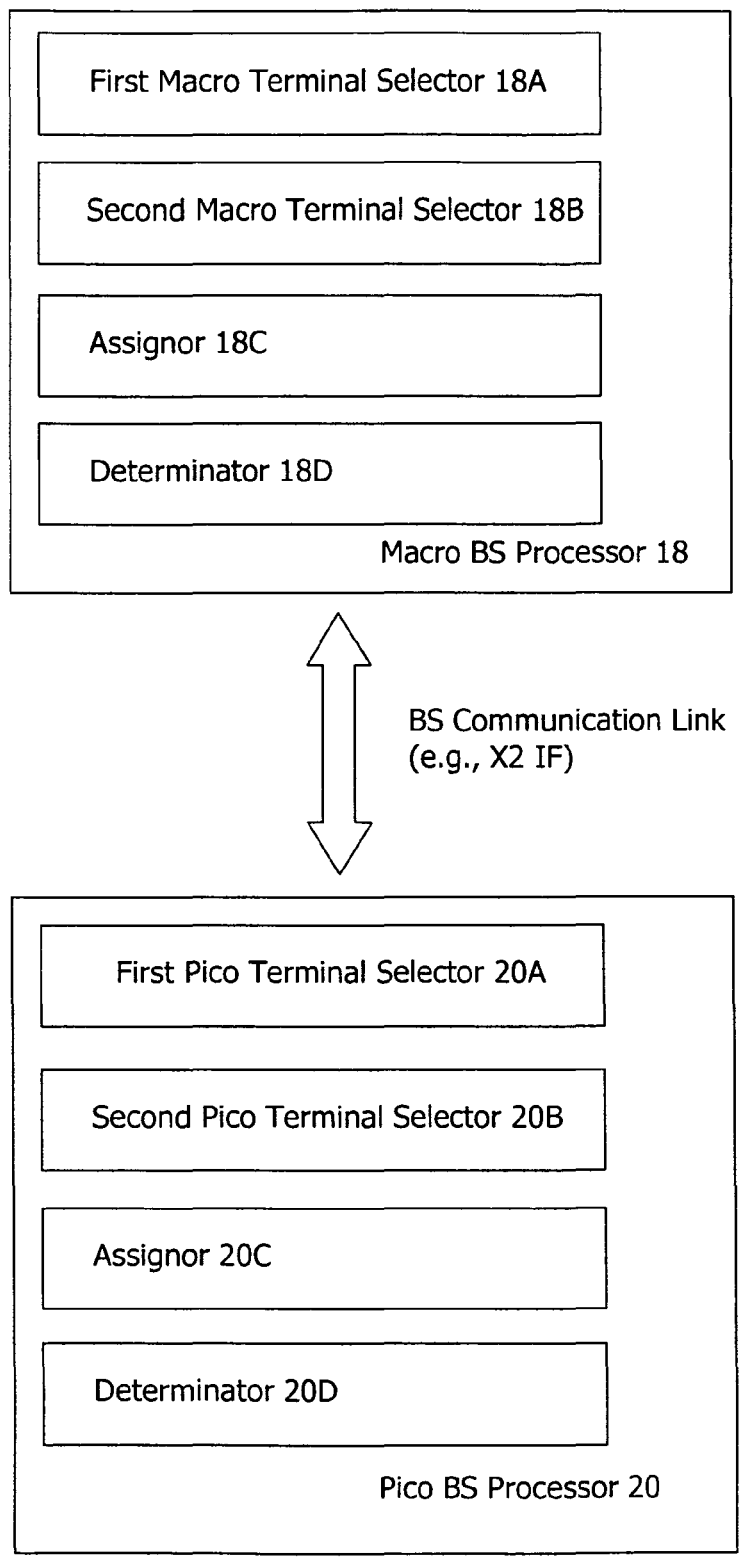
FIG. 1B shows an embodiment of the components and communication between a macro cell BS processor and a pico cell PS processor.

FIG. 1B illustrates various components of the macro BS processor 18 as well as the pico BS processor 20. As becomes apparent from FIG. 1B, the processor 18 of the macro cell 10 comprises a first macro terminal selector 18A for selecting terminals Ms sensitive to interference, a second macro terminal selector 18B for selecting terminals Mi creating strong interference, as well as an assignor 18C adapted to assign the terminals Ms, Mi to individual sub-bands. Further, the processor 18 comprises a determinator 18D adapted to determine, for a given terminal, a performance difference resulting from assigning the terminal to different sub-bands (e.g., as illustrated in FIGS. 5A to 5C).

In a similar manner, the processor 20 of the pico BS 16 comprises a first pico terminal selector 20A adapted to select terminals Ps sensitive to interference, a second pico terminal selector 20B adapted to select strongly interfering terminals Pi, as well as an assignor 20C adapted to assign the selected terminals Ps, Pi to individual sub-bands associated with the pico cell 12. Additionally, a determinator 20D is provided that is adapted to determine, for a given terminal, a performance difference resulting from assigning the terminal to the different sub-bands (e.g., as illustrated in FIGS. 5A to 5C).

The various selectors 18A, 18B, 20A, 20B are configured to individually apply one or more selection rules. Due to the asymmetric interference characteristic, the selection rules applied by the respective first terminal selector 18A, 20A typically differ from the selection rules applied by the respective second terminal selector 18B, 20B. Three exemplary rules, that may be modified and combined as needed, are set forth below:

Terminals Ms, Ps sensitive to interference from terminals served in the other cell layer are selected and assigned to the prioritized sub-band of their serving BS.

Strong interferers Mi, Pi, regardless of their sensitivity to interference, are selected and assigned to the prioritized sub-band of their serving BS.

Low interferers with low sensitivity to interference may be scheduled anywhere, for example in any of the prioritized sub-bands (in order to leave as much transmission resources of the prioritized sub-band as possible for the terminals causing high interference or having a high sensitivity to interference, the low interferers having a low sensitivity to interference may first be assigned to any non-prioritized sub-band and then to the prioritized sub-band once the non-prioritized sub-band becomes highly populated).

As illustrated in FIG. 1B there exists a communication link between the macro BS 14 and the pico BS 16. Specifically, an inter-processor communication link is provided. This communication link permits to exchange information about the respective sub-bands associated with the macro cell 10 and the pico cell 12. Additionally, sub-band negotiation procedures may be performed via this communication link between the macro BS 14 and the pico BS 16.

The communication between the macro BS 14 and the pico BS 16 via the communication link may be based on the X2 interface as defined, for example, for LTE Release 8 (see 3GPP TS 36.423, Evolved Universal Terrestrial Radio Access (E-UTRA), X2 application protocol (X2AP)). Specifically, any of the Information Elements (IEs) exchanged over the X2 interface may be used for sub-band signalling purposes, including the Overload Indicator (OI) and the High Interference Indication (HII).

A first embodiment of assigning terminals to sub-bands for vertical ICIC will now be described with reference to FIGS. 5A and 6A. FIG. 6A illustrates a flow diagram 600 of a method embodiment for assigning terminals to sub-bands, that may be implemented by the macro BS 14 and the pico BS 16 as illustrated in FIGS. 1A, 1B and 3. FIG. 5A shows the resulting sub-band population for the exemplary bandwidth partitioning scheme of FIG. 4.

In a first step 602 the processor 18 of the macro BS 14 performs a selection procedure to select a set of terminals served in the macro cell 10 by the macro BS 14. This selection procedure is performed based on the potential of individual terminals (served by the macro BS 14) of causing interference to terminals served in the pico cell 12.

Independently from the operation of the processor 18 of the macro BS 14, the processor 20 of the pico BS 16 also performs a selection procedure in step 604. The selection procedure performed by the processor 20 aims at selecting a set of terminals (served in the pico cell 12 by the pico BS 16) based on the potential of being sensitive to interference from terminals served in the macro cell 10.

Figure 5A:
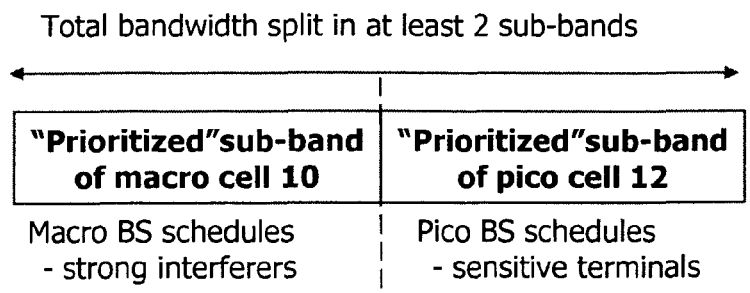
FIG. 5A to 5C illustrate various embodiments of assigning transceiver devices to sub-bands based on the bandwidth partitioning scheme of FIG. 4.
Figure 6A:
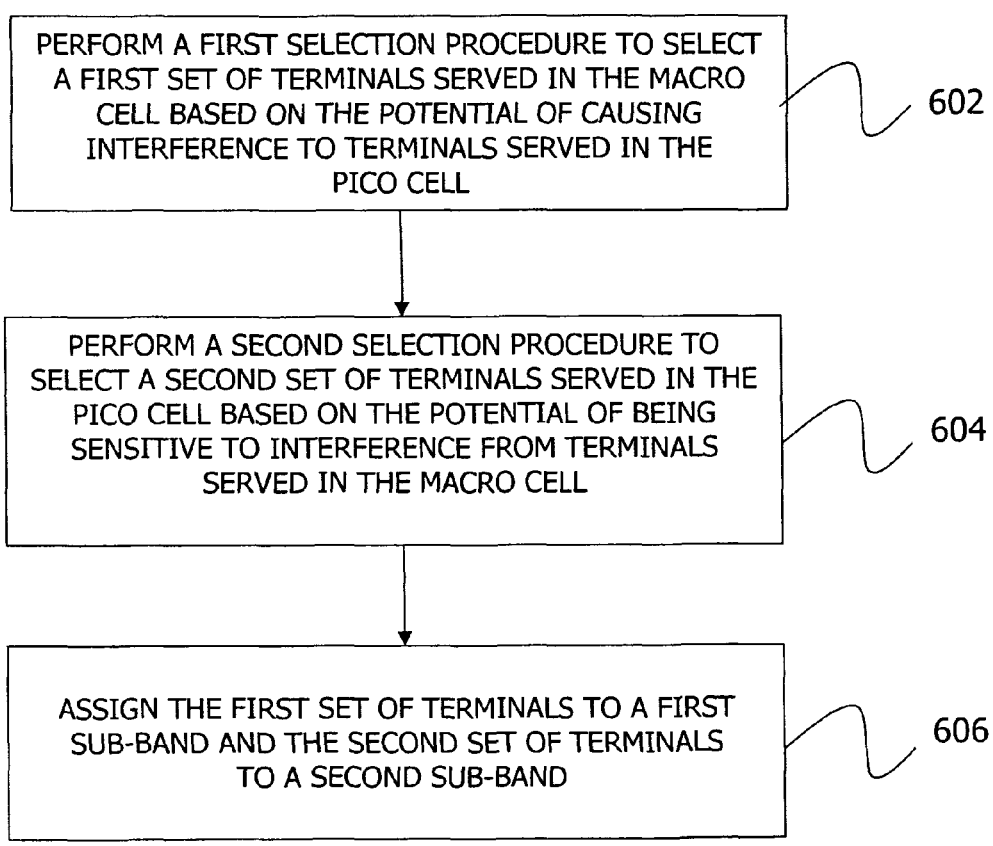

In a further step 606, the processor 18 of the macro BS 14 assigns the terminals thus selected to the prioritized sub-band of the macro cell 10 as illustrated in FIG. 5A.

Additionally, the processor 20 of the pico BS 16 assigns the terminals sensitive to interference to the prioritized sub-band of pico cell 12 as also illustrated in FIG. 5A.

As a result of the assignment strategy shown in FIG. 5A, a collision between strong interferers served in the macro cell 10 and terminals served in the pico cell 12 sensitive to interference can safely be avoided. Otherwise, if the strong macro interferers were scheduled in a close spectral relationship to sensitive pico terminals, a collision would be highly probable due to the relatively higher transmit power of macro terminals on the one hand and the relatively lower transmit power of pico BSs on the other.

Still referring to FIG. 5A, the remaining terminals served by the macro BS 14 and the pico BS 16 may be freely assigned. In one implementation, the processor 18 of the macro BS 14 performs another selection procedure to select a set of terminals served in the macro cell 10 based on the potential of being sensitive to interference from transceiver devices served in the pico cell 12 and assigns the selected transceiver devices also to the prioritized sub-band of the macro cell 10 (or any other sub-band or spectral portion different from the prioritized sub-band of the pico cell 12). In a similar manner, the processor 20 of the pico BS 16 may perform another selection procedure to select a set of terminals served in the pico cell 10 based on the potential of causing interference to terminals served in the macro cell 10 and may assign the selected terminals to the prioritized sub-band of the pico cell 10 (or any other sub-band or spectral portion different from the prioritized sub-band of the macro cell 10).

A second embodiment of assigning terminals to sub-bands for vertical ICIC will now be described with reference to FIGS. 5B and 6B. FIG. 6B illustrates a flow diagram 650 of another method embodiment for assigning terminals to sub-bands that may be implemented by the macro BS 14 as illustrated in FIGS. 1A, 1B and 3. FIG. 5B shows the resulting sub-band population for the exemplary bandwidth partitioning scheme of FIG. 4.

Again, in a first step 652, the processor 18 of the macro BS 14 performs a first selection procedure to select a set of terminals served in the macro cell 10 by the macro BS 14. The selection is directed at determining transceiver devices served in the macro cell 10 based on the potential of causing interference to terminals served in the pico cell 12.

In a further step 654, that may optionally precede step 652, the processor 18 of the macro BS 14 performs another selection procedure to select, independently from the selection procedure of step 652, another set of terminals served in the macro cell 10 based on the potential of being sensitive to interference from terminals served in the pico cell 12. It should be noted that in general different selection rules will be applied in step 652 and 654 due to the asymmetric interference characteristic illustrated in FIG. 3.

Figure 5B:
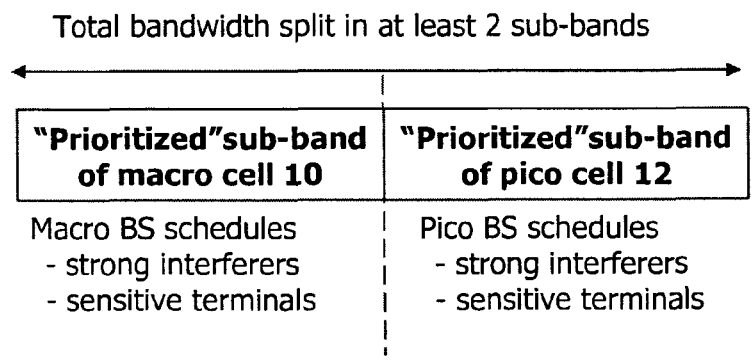

Then, in step 656, the two sets of terminals selected in steps 652 and 654 are assigned to the prioritized sub-band of the macro cell 10 as illustrated in FIG. 5B. It should be noted that in an alternative embodiment, the set of terminals selected in step 652 could also be assigned to a different sub-band than the set of terminals selected in step 654.

The selection steps 652 and 654 as well as the assignment step 656 could in a similar manner be performed by the processor 20 of the pico BS 16. The result of the corresponding selection and assignment operations is also illustrated in FIG. 5B for the prioritized sub-band of the pico cell 12.

A still further assignment scenario is illustrated in FIG. 5C, again based on the exemplary bandwidth partitioning scheme of FIG. 4. The assignment scenario of FIG. 5C is based on the assignment scenario discussed above with reference to FIGS. 5B and 6B.

Figure 5C:
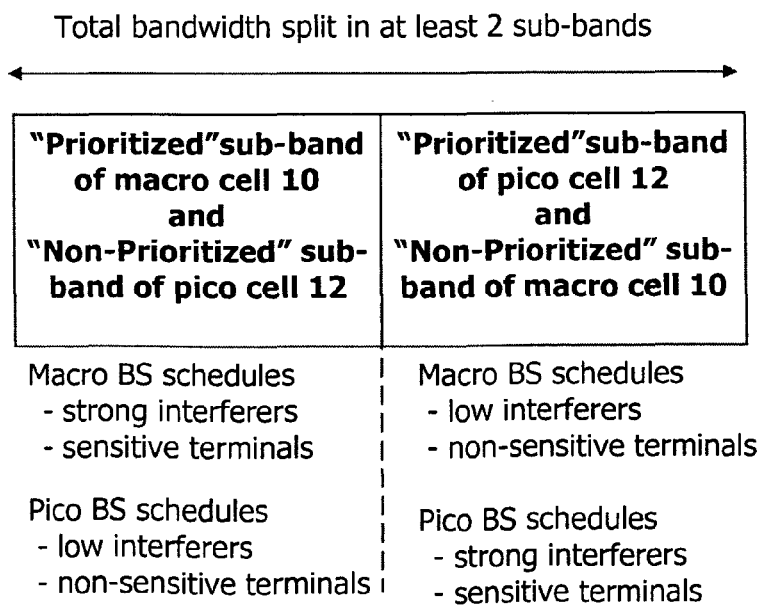

As illustrated in FIG. 5C, the prioritized sub-band of the macro cell 10 may coincide with the non-prioritized sub-band of the pico cell 12. In a similar manner, the prioritized sub-band of the pico cell 12 may coincide with the non-prioritized sub-band of the macro cell 10. This means that the pico BS 16 may co-schedule the non-sensitive terminals served by the pico BS 16 that have a low interference potential with the strong interferers as well as the sensitive terminals served by the macro BS 14. In a similar manner, the macro BS 14 may co-schedule its served terminals that are found to be non-sensitive to interference (and at the same time have a low interference potential) with the strong interferers and interference-sensitive terminals served by the pico BS 16.

It will be appreciated that deviating from the embodiment illustrated in FIG. 5C, the UL transmission bandwidth could in principle also be split into four non-overlapping sub-bands, namely two sub-bands (prioritized/non-prioritized) for the macro cell 10 as well as two sub-bands (prioritized/non-prioritized) for the pico cell 12.

In the following, various embodiments for determining strongly interfering terminals as well as terminals sensitive to interference will be discussed in more detail. It should be noted that the corresponding determination steps could be performed in the context of any of the selection procedures discussed herein.

Three approaches for identifying strongly interfering terminals will be discussed first. According to a first approach, the intention is to determine terminals located at the border between the coverage area of its serving BS and the coverage area of at least one further BS belonging to a different cell layer. This approach is based on the DL transmit power of the serving BS (BS0 hereinafter). Specifically, BS0 calculates for each terminal u served by BS0 the following ratio $$TG_u = \frac{w_{BS0} \cdot TxP_{BS0} \cdot PL_{u,BS0}}{\sum_{j \in M \setminus BS0} w_{BSj} \cdot TxP_{BSj} \cdot PL_{u,BSj}},$$

wherein M is the set of cells BSj belonging to a cell layer different than the cell layer of the cell BS0 serving transceiver device u, $TxP_{BSj}$ is the downlink transmit power of cell BSj, $PL_{u,BSj}$ is the pathloss from transceiver device u to BSj, and $w_{BSj}$ is an optional weight for BSj. The weight can be used to reflect a cell-specific offset $Q_{offset}$ of a cell selection procedure. An exemplary cell selection procedure using such offsets is specified in 3GPP TS 36.304, Evolved Universal Terrestrial Radio Access (E-UTRA), User Equipment (UE) procedures in idle mode. The denominator may further include an additive noise term N as an estimate of terminal receiver noise power.

In a further step, BS0 selects all terminals as cell-edge terminals for which $TG_u < T$, where T is a (pre-defined or dynamically adjusted) threshold. The set of terminals thus selected is identified as comprising terminals having a strong interference potential with respect to cells of a different cell layer.

According to a second approach for identifying strong interferers, a two-step selection procedure is performed. BS0 first selects among its served terminals, u, the ones that have a large pathloss $PL_{u,BS0}$, as they will consequently use a high transmit power. This can be done either by selecting terminals for which the pathloss is larger than a certain threshold, or by ordering the terminals served by BS0 according to their pathloss, and selecting a certain percentage of terminals with the largest pathloss.

From the group of terminals with large pathloss, BS0 then selects the ones that have a low pathloss $PL_{u,BSj}$ to at least one of the BSs belonging to a different cell layer than BS0. This can be done either by applying a threshold as discussed above, or by sorting terminals and selecting a percentage of terminals with lowest pathloss, as explained previously. The set of terminals thus selected is identified as comprising terminals having a strong interference potential with respect to cells of a different cell layer.

A third approach for identifying strong interferers is based on estimating the received (Rx) power at the interfered node. This approach is exemplarily described for the UL, but similar approach may be applied for the DL.

Based on the received RSRP measurements, a BS can deduce the pathloss $PL_{u,BS0}$ between a terminal, u, served by the BS and a neighboring BS, BS0.

The transmit power, $TxP_u$, of terminal u can be estimated from the power headroom report of the terminal or by using the UE power setting equation as specified in 3GPP Technical Specification TS36.213 for LTE.

The interference Rx power caused by terminal u to BS0 is then given by:

$$TxP_u * PL_{u,BS0},$$

A certain (e.g., predefined or dynamically selected) number of the strongest interferers to neighboring BS0 can then be scheduled in the prioritized sub-band of the serving BS (e.g., macro BS 14).

It should be noted that the three approaches for identifying strong interferers presented above can be combined as needed.

In the following, an approach for identifying terminals sensitive to interference from terminals of a different cell layer is described. To identify whether a terminal u is sensitive to UL interference from cells of a different cell layer as its serving base station BS0, BS0 will first calculate the ratio $R_u$ $$R_u = \frac{w_{BS0} \cdot TxP_u \cdot PL_{u,BS0}}{\sum_{j \in M\setminus BS0} w_{BSj} \cdot TxP_{Fj} \cdot PL_{Fj,BS0}},$$

where M is the set of cells belonging to a different cell layer than BS0, Fj refers to a real or fictive terminal that would be served by the adjacent BSj and would be located the closest to the border of the coverage area of BS0, TxPu is the transmit power of terminal u, $PL_{u,BSj}$ is the pathloss between terminal u and BSj, and $w_{BSj}$ is an optional weight for BSj that can be used to reflect a cell specific offset $Q_{offset}$ to the cell selection as discussed above. The denominator may further include an additive noise term N as an estimate of terminal receiver noise power.

There are different ways for BS0 to obtain an estimate of $TxP_{Fj}$ and $PL_{Fj,BS0}$:

Direct estimation of $TxP_{Fj}$ and $PL_{Fj,BS0}$ by BS0:
  BSj informs BS0 about the Reference Symbols (RS) of its terminals so that BS0 can directly estimate the received power based on measurements performed on the reference signals of terminals in cell j.

Transfer of $TxP_{Fj}$ and $PL_{Fj,BS0}$ by BSj
  Terminals served by BSj regularly measure RSRP of adjacent cells and report these measurements to their serving cell (i.e., to BSj). Based on the received RSRP measurements, BSj can deduce the pathloss between the terminal served by it and BS0, $PL_{Fj,BS0}$. Using the terminal power setting equation as specified in 3GPP TS 36.213. Evolved Universal Terrestrial Radio Access (E-UTRA), Physical layer procedures, for an exemplary LTE implementation, BSj can estimate the transmit power of terminal Fj, $TxP_{Fj}$. BSj can then transfer the calculated $PL_{Fj,BS0}$ and $TxP_{Fj}$ to BS0. In addition, it could also transfer an activity factor deduced for the terminal Fj and indicative of, for example, its transmission activities.

Estimation of $TxP_{Fj}$ and $PL_{Fj,BS0}$ by BS0 based on location
  BS0 can get information about the position of surrounding BSs and their DL transmit power either via O&M (Operation and Maintenance), or directly from the surrounding cells by corresponding message exchange. Based on the position of surrounding BSs, their DL transmit power and pathloss model, BS0 can estimate $TxP_{Fj}$ and $PL_{Fj,BS0}$ corresponding to a fictive terminal located at the border between its cell and the adjacent cell j.

Figure 7:
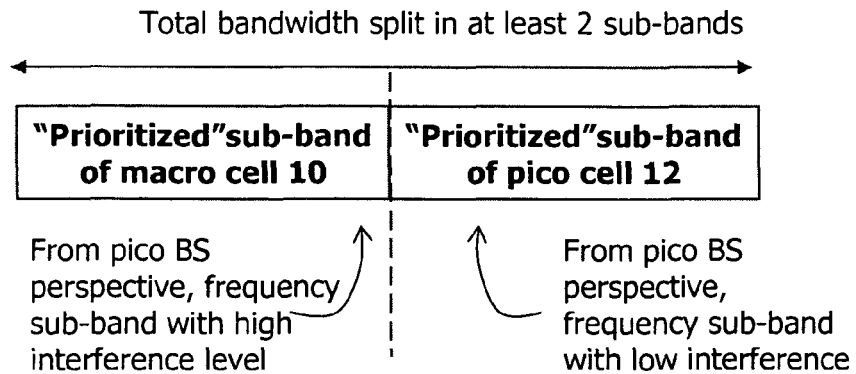
FIG. 7 illustrates a diagram showing the interference level in the sub-bands assigned to the pico cell after an initialization phase.

After a short initialization phase, there is a noticeable difference between the interference level measured in the prioritized sub-band of the pico cell 12 and the interference level measured in the one or more remaining sub-bands, as illustrated in FIG. 7 from the exemplary perspective of the pico BS6. Before the initialization phase (when ICIC as discussed above was not applied), this was not the case.

The following embodiment presents an enhanced assignment strategy for vertical ICIC for a heterogeneous network deployment. The embodiment may be performed in addition to (e.g., after or concurrently with) the interference-centered selection mechanisms described herein and/or independently therefrom (e.g., for a different set if transceiver devices).

Figure 6C:

The embodiment will be described with reference to FIGS. 6C and 7. FIG. 6C illustrates a flow diagram 680 of a method embodiment for assigning terminals to sub-bands. While the method embodiment may in principle be practiced by any one of the macro BS 14 and the pico BS 16 as illustrated in FIGS. 1A, 1B and 3, the following description will focus on the perspective of the pico BS 16 as shown in FIG. 7. It should be noted in connection with FIG. 7 that the underlying sub-band population may be performed in accordance with any one of the strategies illustrated in FIG. 5A to 5C or any other strategy.

With reference to FIG. 6C, in a first step 682 the processor 20 (with its determinator 20D) of the pico BS 16 determines, for a given terminal, a performance difference resulting from assigning the terminal to the prioritized sub-band of the macro cell 10 ("first sub-band") relative to assigning the terminal to the prioritized sub-band of the pico cell 12 ("second sub-band"). The given transceiver device may previously have been assigned to the first sub-band or the second sub-band as discussed above with reference to FIGS. 5A to 5C, 6A and 6B. Alternatively, the given terminal may not yet have been assigned at all.

In a next step 648, the given terminal is assigned by the assignors 20A, B to either the first sub-band or the second sub-band depending on the performance difference determined in step 682. Various exemplary assignment strategies that may be applied in step 648 will now be described in more detail.

In the present embodiment, an initial evaluation of the expected performance improvement (estimated or measured, e.g., in terms of bitrate or error rate) that ICIC can bring to a terminal is proposed. In one implementation, a terminal may be selected for ICIC if the improvement is larger than the reduction of (e.g., the number of) transmission resources that can be scheduled to a terminal due to the ICIC resource partitioning.

The following exemplary approach to select terminals served by the pico BS 16 that will be assigned to the prioritized sub-band of the pico cell 12 (also denoted as "pico sub-band") is based on the (measurable) interference level difference.

1. The pico BS 16 first measures the interference level in its prioritized sub-band (e.g., averaged over a certain time), $I_{own\ band}$, and the (e.g., averaged) interference level in the one or more remaining sub-bands, $I_{other\ bands}$.

2. For each terminal served in the pico cell 12, the pico BS 16 calculates the Signal-to-Noise-and-Interference-Ration (SINR) improvement obtained by assigning the considered terminal to the prioritized pico sub-band. Assuming the interference is prevailing over noise in the denominator I+N, which is often the case in the UL of heterogeneous communication networks at pico BSs, the SINR improvement factor can be estimated as follows.

$$SINR_{imp} \approx I_{other\ bands}/I_{own\ band}$$

3. The estimated SINR improvement leads to a certain bitrate (or transmission rate) improvement which depends on the level of the SINR before improvement, i.e., the SINR in non-prioritized sub-bands from the perspective of the pico BS 16. Using the Shannon equation, the SINR can be mapped to a transmission rate per time-frequency resource unit. Therefore, a bitrate rate can be calculated for the prioritized pico sub-band and for the remaining sub-bands, from which a bitrate improvement factor can be deduced.

An estimate of the SINR of a terminal served in a certain sub-band (prioritized sub-band of pico cell 12 or the remaining sub-bands) can be obtained using the pathgain between the terminal and its serving pico BS 16 and the estimated interference in the particular band:

$$SINR_{band\ b} = TxP \cdot Pg/(I_{band\ b} + N)$$

In case of vertical ICIC in the time domain (see discussion further below), the above selection approach may be implemented as well (i.e., steps 1 to 3 will be similar). The pico BS 16 will measure the interference in the prioritized sub-frames and the remaining sub-frames separately. It may then calculate the SINR improvement in a similar manner as in the above step 2, and compute the bit rate improvement.

Figure 8:
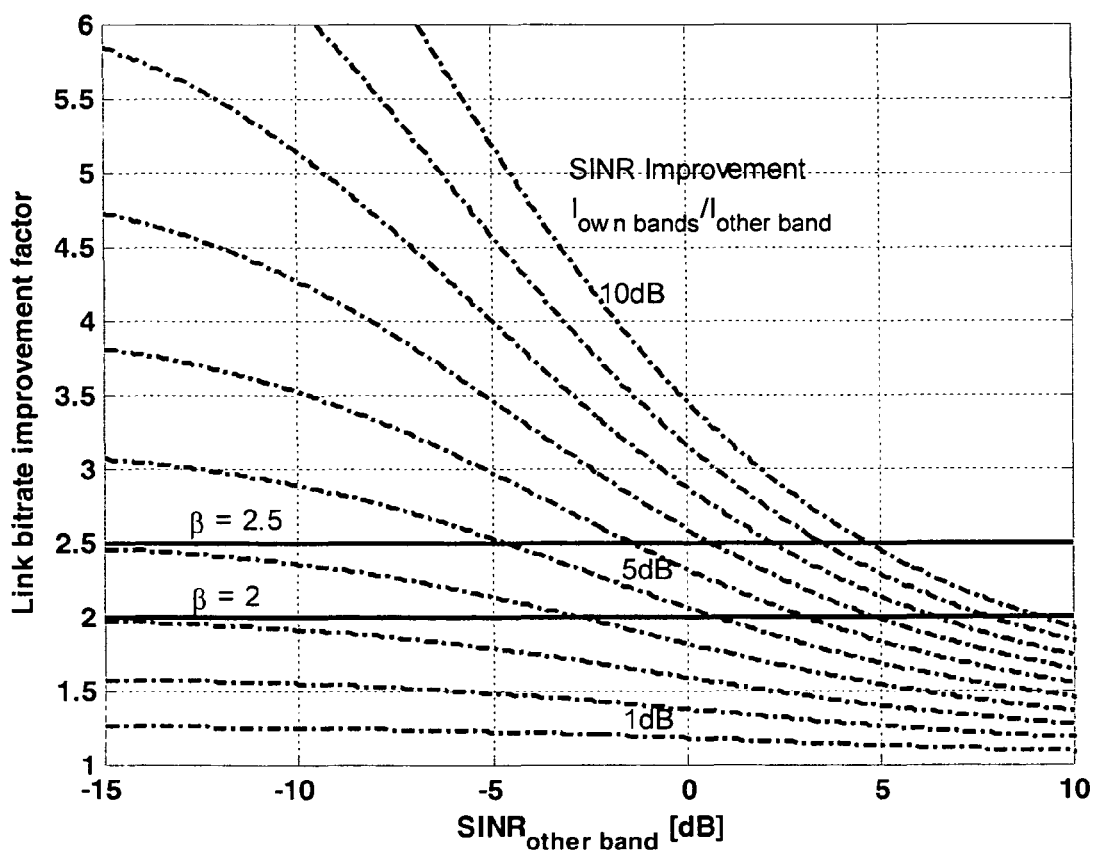
FIG. 8 illustrates a diagram showing a link bitrate improvement factor as a function of SINR.

Pre-calculated mapping curves as presented in FIG. 8 can also be used to find out quickly to which bitrate improvement a certain SINR improvement corresponds. The diagram of FIG. 8 uses the same Shannon based SINR to bitrate function and SINR improvements as described in A. Simonsson, "Frequency Reuse and Intercell Interference Co-ordinatio in E-UTRA", VTC2007-spring.

A Shannon function with a loss factor (e.g., L=0.25) is given by:

$$R = (1-L) \cdot BW \cdot \log_2(1 + SINR),$$

where SINR is the effective SINR in linear measures and BW is the bandwidth. The loss factor L can of course be adapted to an expected link performance as needed.

The relative link bitrate improvement factor (y-axis in FIG. 8) is dependent on the SINR improvement factor $SINR_{imp}$ but independent of bandwidth BW and loss factor L:

$$F_{imp} = \frac{R_{imp}}{R_{ref}} = \frac{\log_2(1 + SINR_{other\_band} \cdot SINR_{imp})}{\log_2(1 + SINR_{other\_band})}$$

A selected set of SNIR improvements is shown in FIG. 8 for 1-10 dB.

According to one exemplary assignment strategy, terminals served by the pico BS 16 are sorted according to their long-term received power (Rx power). In DL, RSRP measurements can be used to sort the terminals. In UL, an estimate of the UL Rx power can be used as well.

Starting from the terminal with lowest Rx power, the pico BS 16 calculates the expected bitrate improvement for each terminal. If the bitrate improvement is larger than a threshold value β, the considered terminal is scheduled in the prioritized sub-band of the pico cell 12. The threshold value β may be defined as the ratio between the size of prioritized sub-band and the size of the total (system) bandwidth (or otherwise). In the example given in FIG. 7 with even bandwidth partitioning between the macro and pico BSs 14, 16, the threshold value β=2. This threshold value β is also indicated in FIG. 8.

If the bitrate improvement for a terminal is below β, the considered terminal (and all remaining terminals with larger Rx power) should not be restricted to the prioritized pico sub-band. These terminals may not be selected for ICIC.

Referring to FIG. 8, if the SINR on the non-prioritized pico band(s) is estimated to be dB for a terminal, and the interference on the prioritized pico sub-band is 5 dB lower, the link bitrate improvement factor is estimated to 1.8 times, which is below the threshold value β (solid line) of 2. This terminal should rather use the non-prioritized pico band. With a 5 dB interference difference between the band all terminals with an estimated SINR below 1 dB (crossing of 5 dB line and β=2 line) on the non-prioritized pico sub-bands shall be scheduled on the prioritized pico sub-band.

Similar assignment strategies can be applied to terminals served in the macro cell 10 and the associated macro sub-bands. For example, the loss experienced by such terminals when they are scheduled in the prioritized macro sub-band may be determined. The goal may be to avoid scheduling terminals in the prioritized macro sub-band for which the bitrate improvement is lower than a threshold value x (e.g., x=0.9).

The population state of the prioritized sub-band in the pico cell 12 can be signaled to the macro cell 10, and vice versa, using, for example, the communication link between the macro BS 14 and the pico BS 16 illustrated in FIG. 1B. The macro cell 10 may then dynamically adjust the size of its prioritized sub-band to the need in the pico cell 12, and vice versa. As an example, the HII (i.e., x2 signaling) can be used to inform the macro BS 14 about the RBs used for prioritized pico terminals (i.e., the population state of the prioritized pico sub-band).

Figure 9:
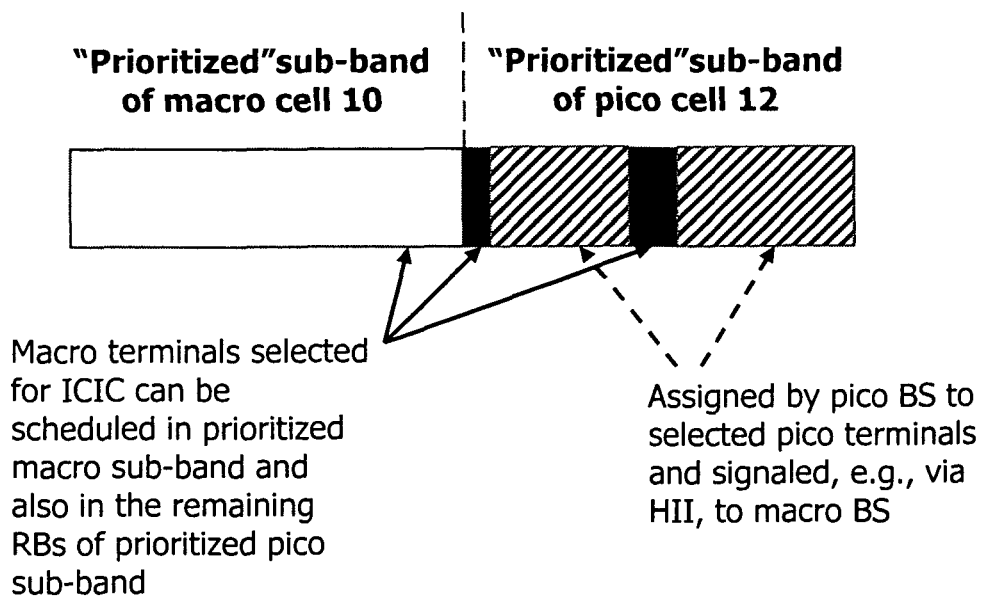
FIG. 9 schematically illustrates a diagram showing an embodiment of a dynamic bandwidth partitioning approach.

As illustrated in FIG. 9, the macro BS 14 may schedule the terminals served by it and selected for ICIC in the prioritized macro sub-band extended by the remaining resources of the prioritized pico sub-band not used by the pico BS 16 for the terminals served by it and selected for ICIC. To this end, negotiation procedures may be performed between the macro BS 14 and the pico BS 16

Referring to FIG. 8, the threshold value β in the pico cell 12 can be adapted accordingly to reflect the adjusted sub-band sizes. If the prioritized sub-band is decreased to be $\frac{2}{3}^{rd}$ of the total bandwidth, the threshold value β is set to 2.5. The threshold for using the prioritized sub-band is then reduced compared to the equal band split (if the interference difference is 5 dB from a 1 dB to −4.5 dB SINR on the non-prioritized band).

The previous discussion mainly focused on vertical ICIC between cells of different cell layers. It would, of course, also be possible to combine such vertical ICIC with horizontal ICIC between cells of the same cell layer as will now be discussed in more detail with reference to FIG. 10.

Figure 10:
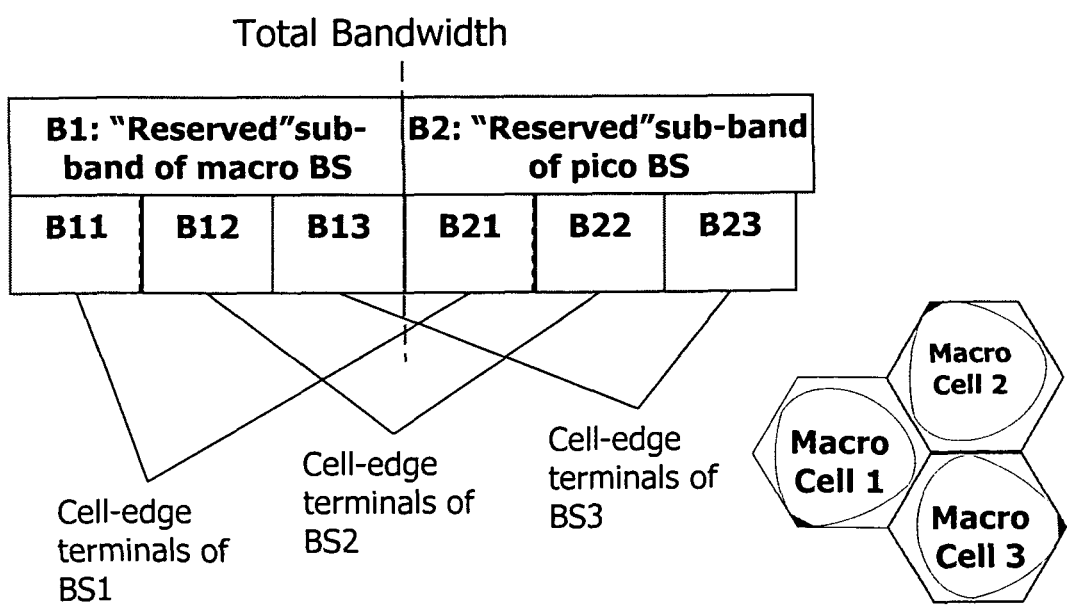
FIG. 10 schematically illustrates an embodiment of a combined vertical and horizontal ICIC mechanism.

FIG. 10 illustrates for the network scenario of FIG. 1A an exemplary bandwidth partitioning scheme (in accordance with FIG. 4) for macro layer ICIC. It will be appreciated that a similar approach could be implemented for pico layer ICIC.

As becomes apparent from FIG. 10, the total bandwidth is split into two sub-bands (B1, B2) depicted by broad columns in FIG. 10. These sub-bands are identical to those illustrated in FIGS. 4 and 5A to 5C. For the exemplary case of three adjacent macro cells as shown in FIG. 10, each sub-band B1, B2 is further split into three partitions B11, B12, B13, B21, B22, B23. It should be noted that the relative sizes of these partitions are not realistic.

In one exemplary assignment scenario, the terminals are first assigned to one of the sub-bands B1, B2 according to any vertical ICIC technique presented herein. In a next step, each macro terminal is further assigned to one of the various partitions B11 to B23 according to any conventional vertical ICIC technique. It should be noted that a combined vertical/horizontal ICIC procedure can also be performed for terminals served in the pico cells. Since pico cells are often sufficiently isolated from each other, this option has not been illustrated in FIG. 10.

The previous discussions focused on ICIC approaches applied in the UL. It will be appreciated that ICIC can also be performed in the DL. Assuming no terminal-specific DL power adjustment, the interference situation does not depend on the terminal that is scheduled on a certain Resource Block (RB) in neighboring cells. This means that, contrary to the UL case, there is no group of strong interferers in DL if no terminal-specific power control is applied.

Figures 11, 12A, 12B:
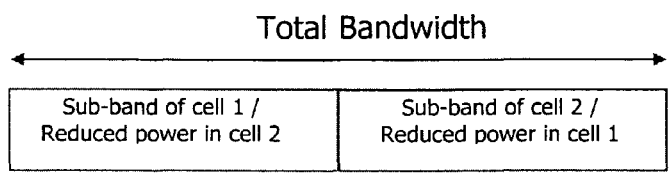
FIG. 11 illustrates a bandwidth partitioning scheme for downlink transmissions.
FIGS. 12A and 12B illustrate an embodiment of a time-domain partitioning scheme for vertical ICIC in the heterogeneous cellular communication network illustrated in FIG. 1A.

In FFR-based ICIC, BSs usually increase their transmit power in their prioritized sub-band and reduce the transmit power in the other sub-bands, as illustrated in FIG. 11 for a similar bandwidth partitioning scheme as illustrated in FIG. 4. In this way, adjacent cells perceive interference reduction in their prioritized sub-band. BSs should then select terminals that are sensitive to interference and assign those to their prioritized sub-band.

There are different approaches to select terminals in this case. In a first approach, a BS calculates for each terminal the geometry $G_u$ as given by $$G_u = \frac{w_{BS0} \cdot TxP_{BS0} \cdot PL_{u,BS0}}{\sum_{j \in C \backslash BS0} w_{BSj} \cdot TxP_{BSj} \cdot PL_{u,BSj}},$$

where, in a network scenario similar to FIG. 1A, C can be either S, the set of adjacent cells within and outside the macro cell area, or M, the set of cells located within the macro cell area, $TxP_{BSj}$ is the transmit power of BSj and $PL_{u,BSj}$ is the pathloss between terminal u and BSj, and $w_{BSj}$ is an optional weight as discussed above. The denominator may further include an additive noise term N as an estimate of terminal receiver noise power.

A particular BS selects then terminals with low geometry $G_u$, either by applying a threshold decision or by sorting terminals in accordance with $G_u$ and selecting a percentage of terminals with lowest pathloss, as explained previously.

According to an alternative selection approach, since FFR is applied only between cells of the same macro cell area is exemplarily considered here, a BS may want to schedule terminals in the particular prioritized sub-band that will actually benefit from a lower interference coming from this group of cells. Therefore, in this second selection approach, a BS needs to select terminals that receive interference mostly from cells within or outside the macro cell area. For this purpose, a BS (e.g., BS0) can calculate the ratio $R_u$:

$$R_u = \frac{\sum_{j \in S \backslash \{M \cup BS0\}} \overline{TxP_{BSj}} \cdot PL_{u,BSj}}{\sum_{j \in M \backslash BS0} \overline{TxP_{BSj}} \cdot PL_{u,BSj}},$$

where M is the set of cells located within the macro cell area and S is the set of adjacent cells within and outside the macro cell area (so S contains M), $TxP_{BSj}$ is the transmit power of BSj and $PL_{u,BSj}$ is the pathloss between terminal u and BSj.

In a second step, BS0 compares the calculated ratio with a threshold $\epsilon$. If $R_{BS0} < \epsilon$, then it can be considered that the DL interference generated by cells located within the same macro cell area as BS0 is predominant for the particular terminal u. Consequently, this terminal u should be scheduled in the prioritized band of BS0.

The second selection approach is particularly relevant for macro BS as the terminals served by it often suffer from interference from neighboring macro cells. Only few macro terminals will actually experience strong DL interference from a pico BS.

The discussion above was focused on FFR-based ICIC schemes. In the following, embodiments that comprise an ABS-based or RBS-based ICIC scheme will be described with reference to FIGS. 12A and 12B. It should be noted that many of the implementation details discussed above with reference to FFR can be also be realized in an ABS or RBS scenario.

The basic idea of ABS is to partition the available frequency resources in the time domain into individual sub-frames and to assign different sub-frames to adjacent cells. Specifically, LTE Release 10 has introduced the ABS concept to protect pico terminals from strong DL interference based on a cell selection offset. FIG. 12A shows the transmission resource partitioning in the time domain for vertical ICIC in a heterogeneous network as illustrated in FIG. 1A.

As illustrated in FIG. 12A, in the sub-frames denoted by ABS, the macro BS 14 does not transmit any data nor control information (and thus reduces the interference level caused to non-served pico terminals). For the pico BS 16, a sub-frame corresponding to an ABS on the macro layer can be seen as a reserved (or prioritized) sub-frame to schedule pico terminals. As will be appreciated, a DL ABS results in a UL ABS for the macro BS 14. Since the macro BS 14 cannot send the UL grants in the DL ABS, no UL transmission can be scheduled in the sub-frame occurring 4 ms after a DL ABS.

For LTE Release 12, RBS is being discussed in 3GPP. RBS allows the macro BS 14 to transmit in the ABS, but with a reduced power.

As will be appreciated, in ABS or RBS scenario, a dynamic partitioning scheme similar to the dynamic bandwidth partitioning scheme illustrated in FIG. 9 can be implemented. With reference to FIG. 12B, the pattern of reserved sub-bands for pico terminals can be adapted according to the need of the pico BS 16. In the example illustrated in FIG. 12A, the ABS pattern specifies that 50% of the sub-frames are reserved for the pico BS 16. If the need for reserved sub-frames reduces in the pico BS 16 reduces, signaling may take place between the pico BS 16 and the macro BS 14 as described above to agree on a new ABS pattern with fewer prioritized sub-frames for the pico BS 16. An example of an adapted pattern is illustrated in FIG. 12B.

As has been discussed above, LTE and other systems permit the allocation of transmission resources in accordance with a two-dimensional resource grid. This means that the FFR-based vertical ICIC schemes as well as the ABS (or RBS)-based ICIC schemes as presented herein may be combined as will now exemplarily be described with reference to FIG. 13.

As has been discussed above (e.g., with reference to the network scenario illustrated in FIGS. 1A and 3), four sets of terminals can be distinguished based on their interference potential and interference sensitivity for each of the pico cell layer and the macro cell layer. This knowledge permits to allocate the terminals according to their interference potential and their interference sensitivity in two resource dimensions (time and frequency) as illustrated in FIG. 13.

Figure 13:
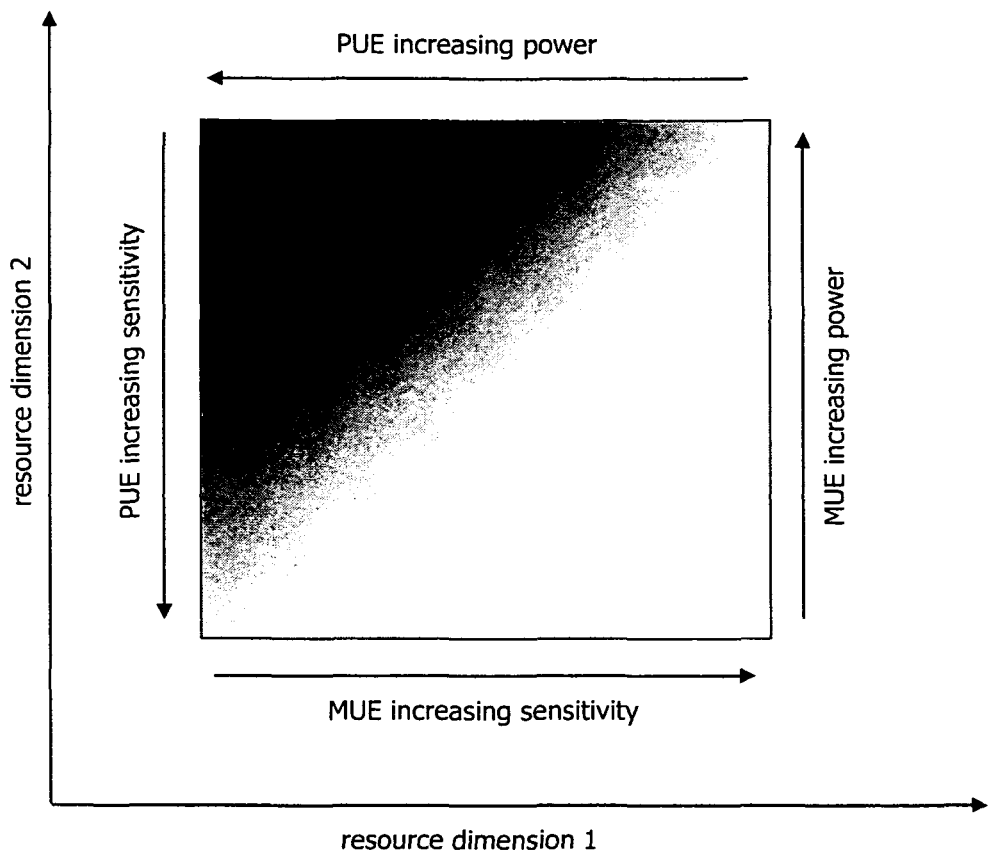
FIG. 13 illustrates an embodiment of the allocation of resources representable as a two-dimensional resource grid to transceiver devices of different cell layers.

As shown in FIG. 13, pico terminals (PUEs) with a high interference potential are co-scheduled with macro terminals (MUEs) having a low sensitivity to interference in neighboring regions of the two-dimensional resource grid. In a similar manner, macro terminals with a high interference potential are co-scheduled with pico terminals having a low sensitivity to interference.

The resource allocation scheme illustrated in FIG. 13 may lead to a situation in which less free transmission resources are available in a resource region allocated to a terminal than the terminal presently requires. In such a situation, according to a first approach the available resources may be determined and the amount of data that fits into these resources may be transmitted (e.g., the transmission rate of the terminal may be appropriately adapted). The data that cannot be transmitted will remain in a data transmission buffer of this terminal until the next scheduling occasion.

According to an alternative approach, it is determined if resource regions neighboring the resource region allocated to the terminal still have available transmission resources. In this case, such neighboring resources may additionally be allocated to the terminal (preferably in the direction of regions intended for increased power and/or increased sensitivity). Should the neighboring regions not provide sufficient resources for the terminal, the "resource borrowing" from neighboring regions can also extend over multiple regions (i.e., traverse through the resource grid). In this regard, one option would be to first search for available resource regions in the direction of increased power, then in the direction of increased sensitivity, and finally in the region diagonal to the preferred region (i.e., the region with increased power and sensitivity).

Any of the above approaches may be preceded by an ordering step in which an ordered list of terminals to which resource regions are to be allocated is generated. The ranking of the terminals may be performed based on one or more parameters, including subscription-based information and data transmission capacity. The allocation of resource regions to terminals may then be performed in accordance with the ordering of terminals (e.g., in the direction of decreasing rank).

It should be noted that the two-dimensional resource grid illustrated in FIG. 13 could also be transformed into a one-dimensional scheme. According to such a transformation, the two-dimensionally arranged resource regions are simply copied to a linear sequence, scanning through the two-dimensional resource grid in two loops (e.g., an inner loop for the horizontal dimension and an outer loop for the vertical dimension).

As has become apparent from the above description of exemplary embodiments, a vertical ICIC technique should take into account the asymmetric interference situation of heterogeneously deployed cellular communication networks. If this asymmetry is considered, actual performance gains can be expected from vertical ICIC. It may also be feasible to combine vertical ICIC with horizontal ICIC to achieve an even higher performance gain.

While the technique presented herein has been described with respect to particular embodiments, those skilled in the art will recognize that the present invention is not limited to the specific embodiments described and illustrated herein. Accordingly, it is to be understood that this disclosure is only illustrative and that it is intended that the invention be limited only by the scope of the claims appended hereto.

The invention claimed is:

1. A method of assigning transceiver devices to transmission resources for inter-cell interference coordination in a heterogeneous communication network with a first cell layer having a first cell associated with a first transmission resource and a second cell layer having a second cell associated with a second transmission resource disjunctive from the first transmission resource, the method comprising:
   performing a first selection procedure to select a first set of transceiver devices served in the first cell, based on the potential of causing interference to transceiver devices served in the second cell;
   performing a second selection procedure to select a second set of transceiver devices served in the second cell, based on the potential of being sensitive to interference from transceiver devices served in the first cell; and
   assigning the first set of transceiver devices to the first transmission resource and the second set of transceiver devices to the second transmission resource.

2. The method of claim 1, wherein the first cell is associated with at least one of a higher nominal transmit power and a larger coverage area than the second cell.

3. The method of claim 1, further comprising:
   performing a third selection procedure to select a third set of transceiver devices served in the first cell, based on the potential of being sensitive to interference from transceiver devices served in the second cell; and
   assigning the third set of transceiver devices to the first transmission resource.

4. The method of claim 1, further comprising:
   performing a fourth selection procedure to select a fourth set of transceiver devices served in the second cell, based on the potential of causing interference to transceiver devices served in the first cell; and
   assigning the fourth set of transceiver devices to the second transmission resource.

5. The method of claim 1, wherein the first cell is further associated with a third transmission resource and/or the second cell is further associated with a fourth transmission resource.

6. The method of claim 5, further comprising at least one of:
   assigning transceiver devices served in the first cell and not included in at least one of the first set and the third set to the third transmission resource; and assigning transceiver devices served in the second cell and not included in at least one of the second set and the fourth set to the fourth transmission resource.

7. The method of claim 6, further comprising at least one of:
assigning transceiver devices served in the first cell and not included in at least one of the first set and the third set to the first transmission resource, when the third transmission resource becomes highly populated; and
assigning transceiver devices served in the second cell and not included in at least one of the second set and the fourth set to the second transmission resource, when the fourth transmission resource becomes highly populated.

8. The method of claim 5, wherein the fourth transmission resource is disjunctive from the third transmission resource.

9. The method of claim 5, wherein there exists an at least partial overlap between at least one of:
the first transmission resource and the fourth transmission resource; and
the second transmission resource and the third transmission resource.

10. The method of claim 1, further comprising deciding whether to associate a particular transceiver device with either the first cell or the second cell based on power measurements.

11. The method of claim 10, wherein the power measurements involve Reference Signal Received Power (RSRP) measurements.

12. The method of claim 1, wherein the selection procedures are based on at least one of transmit power and pathloss to a serving base station.

13. The method of claim 1, wherein selecting a transceiver device u based on the potential of causing interference is performed based on a selection parameter $$TG_u = \frac{w_{BS0} \cdot TxP_{BS0} \cdot PL_{u,BS0}}{\sum_{j \in M \setminus BS0} w_{BSj} \cdot TxP_{BSj} \cdot PL_{u,BSj}},$$

wherein M is the set of cells BSj belonging to a cell layer different than the cell layer of the cell BS0 serving transceiver device u, $TxP_{BSj}$ is the downlink transmit power of cell BSj, $PL_{u,BSj}$ is the pathloss from transceiver device u to BSj, and $w_{BSj}$ is a weight for BSj.

14. The method of claim 1, wherein selecting transceiver devices based on the potential of causing interference comprises:
determining, for a given cell, transceiver devices served by the cell and having a large pathloss to the serving base station; and
selecting, among the transceiver devices thus determined, the transceiver devices having a low pathloss to a base station of any cell belonging to a different cell layer than the given cell.

15. The method of claim 1, wherein selecting transceiver devices based on the potential of causing interference comprises:
determining, for a given transceiver device served by a given cell, an interference parameter from an estimated pathloss of the transceiver device to a base station of a cell belonging to a different cell layer than the given cell and an estimated transmit power of the transceiver device; and
selecting the transceiver device dependent on the interference parameter.

16. The method of claim 15, wherein the pathloss is estimated based on a power measurement report received from the transceiver device and/or wherein the transmit power is estimated based on at least one of a power headroom report received from the transceiver device and a predefined power setting equation.

17. The method of claim 1, wherein selecting a transceiver device u based on the potential of being sensitive to interference is performed based on a selection parameter $$R_u = \frac{w_{BS0} \cdot TxP_u \cdot PL_{u,BS0}}{\sum_{j \in M \setminus BS0} w_{BSj} \cdot TxP_{Fj} \cdot PL_{Fj,BS0}},$$

wherein M is the set of cells BSj belonging to a cell layer different than the cell layer of the cell BS0 serving transceiver device u, Fj refers to a real or fictive transceiver device that would be served by BSj and would be located the closest to the border of the coverage area of BS0, TxP is the uplink transmit power of the respective transceiver device, $PL_{BSj}$ is the pathloss from the respective transceiver device to BSj, and $w_{BSj}$ is a weight for BSj.

18. The method of claim 1, wherein the first cell layer comprises a third cell, and further comprising:
dividing a particular transmission resource into a first portion and a second portion disjunctive from the first portion;
performing a third selection procedure to select among the transceiver devices of the first set a third set of transceiver devices based on the potential of causing interference to transceiver devices served in the third cell or based on the potential of being sensitive to interference from transceiver devices served in the third cell; and
assigning the third set of transceiver devices to the first portion of the particular transmission resource.

19. The method of claim 18, further comprising:
performing a fourth selection procedure to select among the transceiver devices served in the third cell a fourth set of transceiver devices based on the potential of causing interference to transceiver devices served in the first cell or based on the potential of being sensitive to interference from transceiver devices served in the first cell; and
assigning the fourth set of transceiver devices to the second portion of the particular transmission resource.

20. The method of claim 18, wherein the particular transmission resource is either one of the first transmission resource and the second transmission resource for a cell of the first cell layer or either one of the second transmission resource and a third transmission resource for a cell of the second cell layer.

21. The method of claim 1, wherein the second cell layer comprises a third cell, and further comprising:
dividing a particular transmission resource into a first portion and a second portion disjunctive from the first portion;
performing a third selection procedure to select among the transceiver devices of the second set a third set of transceiver devices based on the potential of causing interference to transceiver devices served in the third cell or based on the potential of being sensitive to interference from transceiver devices served in the third cell; and
assigning the third set of transceiver devices to the first portion of the particular transmission resource.

22. The method of claim 21, further comprising:
performing a fourth selection procedure to select among the transceiver devices served in the third cell a fourth set of transceiver devices based on the potential of causing interference to transceiver devices served in the second cell or based on the potential of being sensitive to interference from transceiver devices served in the second cell; and
assigning the fourth set of transceiver devices to the second portion of the particular transmission resource.

23. The method of claim 1, wherein the transceiver devices are configured to transmit on transmission resources representable as a resource grid spanning two resource dimensions, and further comprising allocating adjacent regions of the resource grid to at least one of:
transceiver devices served in the first cell and having the potential of causing interference to transceiver devices served in the second cell and transceiver devices served in the second cell and being insensitive to interference from transceiver devices served in the first cell; and
transceiver devices served in the second cell and having the potential of causing interference to transceiver devices served in the first cell and transceiver devices served in the first cell and being insensitive to interference from transceiver devices served in the second cell.

24. The method of claim 23, further comprising controlling a data transmission of a transceiver device in accordance with the available transmission resources in the region of the resource grid allocated to the transceiver device.

25. The method of claim 23, further comprising additionally allocating one or more neighboring regions to a transceiver device to which a specific region has been allocated, depending on the amount of data to be transmitted by the transceiver device.

26. The method of claim 1, further comprising:
determining, for a given transceiver device, a performance difference resulting from assigning the transceiver device to the first transmission resource relative to assigning the transceiver device to the second transmission resource; and
assigning the transceiver device to either the first transmission resource or the second transmission resource depending on the performance difference.

27. The method of claim 1, further comprising performing an adjustment operation to dynamically adjust at least one of a size of the first transmission resource and a size of the second transmission resource.

28. The method of claim 27, wherein the adjustment operation is based on a population state of one or both of the first transmission resource and the second transmission resource.

29. The method of claim 28, further comprising at least one of:
signaling the population state of the first transmission resource from the first cell to the second cell; and
signaling the population state of the second transmission resource from the second cell to the first cell.

30. The method of claim 27, wherein the adjustment operation is performed such that a combined size of the first transmission resource and the second transmission resource remains constant.

31. The method of claim 1, wherein each of the respective transmission resources is a sub-band or a sub-frame.

32. A method of assigning transceiver devices to transmission resources for inter-cell interference coordination in a heterogeneous communication network with a first cell layer having a first cell associated with a first transmission resource and a second transmission resource and a second cell layer having a second cell, the method comprising:
performing a first selection procedure to select a first set of transceiver devices served in the first cell, based on the potential of causing interference to transceiver devices served in the second cell;
performing a second selection procedure to select a second set of transceiver devices served in the first cell, based on the potential of being sensitive to interference from transceiver devices served in the second cell; and
assigning the first set of transceiver devices to the first transmission resource and the second set of transceiver devices to the second transmission resource.

33. The method of claim 32, wherein the first transmission resource at least partially overlaps with the second transmission resource.

34. The method of claim 32, further comprising:
determining, for a given transceiver device, a performance difference resulting from assigning the transceiver device in the first transmission resource relative to assigning the transceiver device in the second transmission resource; and
assigning the transceiver device to either the first transmission resource or the second transmission resource depending on the performance difference.

35. A method of assigning transceiver devices to transmission resources for inter-cell interference coordination in a heterogeneous communication network with a first cell layer having a first cell associated with a first transmission resource and a second cell layer having a second cell associated with a second transmission resource disjunctive from the first transmission resource, wherein the first transmission resource is populated with transceiver devices served in the first cell and having the potential of causing interference to transceiver devices served in the second cell, and the second transmission resource is populated with transceiver devices served in the second cell and having the potential of being sensitive to interference from transceiver devices served in the first cell, the method comprising:
determining, for a given transceiver device, a performance difference resulting from assigning the transceiver device to the first transmission resource relative to assigning the transceiver device to the second transmission resource; and
assigning the transceiver device to either the first transmission resource or the second transmission resource depending on the performance difference.

36. The method of claim 35, wherein the performance difference is determined based on an interference level of the first transmission resource relative to an interference level of the second transmission resource.

37. The method of claim 35, wherein the performance difference is indicative of a bitrate improvement for the transceiver device.

38. The method claim 35, further comprising:
determining a ranking among a set of transceiver devices that are to be assigned to transmission resources; and
performing the determining and assigning steps for one or more of the transceiver devices in accordance with their ranking within the set.

39. The method of claim 38, wherein the ranking is determined for each transceiver device of the set based on the estimated likelihood that the transceiver device will be assigned to either one of the first transmission resource and the second transmission resource.

40. The method of claim 38, wherein the ranking of each transceiver device of the set is determined based on its received power.

41. The method of claim 35, wherein the determining step is performed until a first transceiver device of the set is assigned to another transmission resource than transceiver devices having a higher ranking than the first transceiver device, and wherein transceiver devices having a lower ranking than the first transceiver device are also assigned to the other transmission resource without performing the determining step for the transceiver devices having the lower ranking.

42. The method of claim 35, wherein assigning the transceiver device to either the first transmission resource or the second transmission resource comprises applying the performance difference to a threshold decision.

43. The method of claim 42, wherein a threshold value for the threshold decision is based on a size of the first transmission resource relative to a combined size of the transmission resources to which the transceiver devices may be assigned.

44. The method of claim 43, further comprising dynamically performing an adjustment operation to adjust the size of at least one of the first transmission resource and the second transmission resource, wherein the threshold value is adapted responsive to the adjustment operation.

45. The method of claim 35, wherein each of the respective transmission resources is a sub-band or a sub-frame.

46. A system for assigning transceiver devices to transmission resources for inter-cell interference coordination in a heterogeneous communication network with a first cell layer having a first cell associated with a first transmission resource and a second cell layer having a second cell associated with a second transmission resource disjunctive from the first transmission resource, the system comprising:
a first processor adapted to select a first set of transceiver devices served in the first cell based on the potential of causing interference to transceiver devices served in the second cell and to assign the first set of transceiver devices to the first transmission resource; and
a second processor adapted to select a second set of transceiver devices served in the second cell based on the potential of being sensitive to interference from transceiver devices served in the first cell and to assign the second set of transceiver devices to the second transmission resource.

47. The system of claim 46, implemented within base stations of the communication network.

48. A device for assigning transceiver devices to transmission resources for inter-cell interference coordination in a heterogeneous communication network with a first cell layer having a first cell associated with a first transmission resource and a second transmission resource and a second cell layer having a second cell, the device comprising a processor having:
a first selector adapted to select a first set of transceiver devices served in the first cell based on the potential of causing interference to transceiver devices served in the second cell;
a second selector adapted to select a second set of transceiver devices served in the first cell based on the potential of being sensitive to interference from transceiver devices served in the second cell; and
an assignor adapted to assign the first set of transceiver devices to the first transmission resource and the second set of transceiver devices to the second transmission resource.

49. The device of claim 48, implemented in a base station of the communication network.

50. A device for assigning transceiver devices to transmission resources for inter-cell interference coordination in a heterogeneous communication network with a first cell layer having a first cell associated with a first transmission resource and a second cell layer having a second cell associated with a second transmission resource disjunctive from the first transmission resource, wherein the first transmission resource is populated with transceiver devices served in the first cell and having the potential of causing interference to transceiver devices served in the second cell, and the second transmission resource is populated with transceiver devices served in the second cell and having the potential of being sensitive to interference from transceiver devices served in the first cell, the device comprising a processor having:
a determinator adapted to determine, for a given transceiver device, a performance difference resulting from assigning the transceiver device to the second transmission resource relative to assigning the transceiver device to the first transmission resource; and
an assignor adapted to assign the transceiver device to either the first transmission resource or the second transmission resource depending on the performance difference.

* * * * *